United States Patent Office 3,021,310
Patented Feb. 13, 1962

3,021,310
POLYMERIZATION OF CYCLIC ESTERS
Eugene F. Cox and Fritz Hostettler, Charleston, W. Va., assignors to Union Carbide Corporation, a corporation of New York
No Drawing. Filed Dec. 3, 1959, Ser. No. 856,905
26 Claims. (Cl. 260—78.3)

This invention relates to a process for polymerizing cyclic esters and to the products resulting therefrom.

The most generally familiar works on the polymerization of lactones are the now classical investigations of W. H. Carothers.[1] For instance, Carothers was able to polymerize delta-valerolactone to poly-delta-valerolactone by heating at 80°–85° C. for a period of about 13 days, or by contacting delta-valerolactone with potassium carbonate catalyst at a temperature of 80°–85° C. for a period of about 5 days. The resulting polymers were soft waxes possessing average molecular weights of approximately 2000 which had relatively low thermal stabilities. The literature reports that attempts to polymerize gamma-butyrolactone have been unsuccessful, and the corresponding polyester is not known. In 1934, there was reported [2] the preparation of poly-epsilon-caprolactone by heating epsilon-caprolactone at about 150° C. for a period of 12 hours, or by contacting epsilon-caprolactone with potassium carbonate at about 150° C. for a period of 5 hours. The resulting epsilon-caprolactone polymers had melting points of about 53°–55° C. and average molecular weights of about 4000. The polymers were hard, brittle waxes which could not be cold-drawn into fibers. Bischoff and Waldon [3] describe the transformation of glycolide under the influence of heat or a trace of zinc chloride into a polymeric solid melting at 220° C. On being distilled in a vacuum it was reconverted to the monomer melting at 86°–87° C. The literature also reports the polymerization of lactide at elevated temperature to a resinous mass. A similar effect is also obtained at relatively lower temperatures by employing potassium carbonate as the catalyst.

In a broad aspect the present invention is directed to the process for polymerizing monomeric cyclic esters in contact with an organometallic catalyst to produce useful polyester products, both the cyclic ester reagents and the organometallic catalysts being described hereinafter in a more appropriate section. The average molecular weights of the resulting polymers can range from about several hundred to about several hundred thousand, e.g., about 900 to 250,000 and higher. The relatively high molecular weight homopolymers and various copolymers and terpolymers prepared by the practice of the instant invention are highly useful products as will become apparent at a later section herein. In addition, the polymerization reaction can be conducted at lower temperatures and at faster polymerization rates heretofore unattainable in lactone polymerization art.

Accordingly, one or more of the following objects will be achieved by the practice of this invention.

It is an object of this invention to provide a novel process for homopolymerizing monomeric cyclic esters to produce novel and useful homopolymers. It is another object of this invention to provide a novel process for polymerizing an admixture containing at least two different monomeric cyclic esters to produce novel and useful polymers. A further object of this invention is to prepare novel lactone polymers having a high degree of utility and application in the molding, coating, fiber, film,

[1] Collected Papers of Wallace H. Carothers, edited by H. Mark and G. S. Whitby, volume I, Interscience Publishers, Inc., New York (1940).
[2] F. J. van Natta, J. W. Hill, and W. H. Carothers, Jour. Amer. Chem. Soc., 56, 455 (1934).
[3] Ber. 36, 1200 (1903).

etc., fields. Other objects will become apparent to those skilled in the art in the light of the instant specification.

In one embodiment the monomeric cyclic esters employed in the polymerization process of this invention can be characterized by the following formula:

(I) 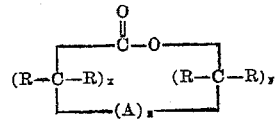

wherein each R, individually, can be hydrogen, alkyl, aryl, alkaryl, aralkyl, cycloalkyl, halo, haloalkyl, alkoxyalkyl, alkoxy, aryloxy, and the like; wherein A can be an oxy (—O—) group, a thio (—S—) group, a divalent saturated aliphatic hydrocarbon group, and the like; wherein $x$ is an integer from 1 to 15 inclusive; wherein $y$ is an integer from 1 to 15 inclusive; wherein $z$ is an integer having a value of zero or one; with the provisos that (a) the sum of $x+y+z$ cannot equal 3, (b) the total number of atoms forming the cyclic ester ring does not exceed 18, preferably does not exceed 9, (c) the total number of organic substituents (such as those described for the R variables) attached to the carbon atoms contained in the cyclic ester ring does not exceed 4, preferably does not exceed 3, (d) from 2 to 4 continuously linked carbon atoms contained in the cyclic ester ring can represent a portion of a saturated cycloaliphatic hydrocarbon nucleus which contains from 4 to 10 ring carbon atoms, and (e) the four R variables attached to any two adjacent carbon atoms contained in the cyclic ester ring can represent a portion of a fused aromatic hydrocarbon nucleus.

With reference to Formula I supra, illustrative R radicals include, among others, methyl ethyl, n-propyl, isopropyl, n-butyl, sec-butyl, t-butyl, amyl, the hexyls, the heptyls, the octyl, dodecyl, octadecyl, phenyl, benzyl, tolyl, xylyl, ethylphenyl, butylphenyl, phenethyl, phenylpropyl, phenylbutyl, cyclopentyl, 2-propylcyclohexyl, cyclohexyl, 2-methylcyclohexyl, cycloheptyl, chloromethyl, chloroethyl, bromopropyl, bromobutyl, chloro, fluoro, bromo, iodo, methoxymethyl, ethoxyethyl, propoxymethyl, butoxypropyl, methoxy, ethoxy, n-propoxy, n-butoxy, isopentoxy, n-hexoxy, 2-ethylhexoxy, 3-methyloctoxy, decoxy, dodecoxy, octadecoxy, phenoxy, ethylphenoxy, propylphenoxy, dimethylphenoxy, phenylpropoxy, and the like. It is preferred that each R, individually, be hydrogen, alkyl, and/or alkoxy, and preferably still, that each R, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the substituents attached to the cyclic ester ring does not exceed twelve. Cycloalkyl and lower alkyl-substituted cycloalkyl radicals which have from 5 to 7 carbon atoms in the cycloaliphatic nucleus also are preferred.

In the discussion of the generic class of monomeric cyclic esters (Formula I) contemplated in the process of the invention, five provisos enumerated from (a) through (e) have been set forth. Proviso (a) states that the sum of $x+y+z$ cannot be a number equal to three. This proviso excludes cyclic ester compounds which contain five atoms in the ring such as, for example,

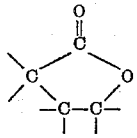

A gamma-butyrolactone

Prior art [4] attempts to polymerize gamma-butyrolactone and the substituted gamma-butyrolactones have been unsuccessful. Attempts to polymerize the cyclic esters, e.g., gamma-butyrolactones, beta-oxa-gamma-butyrolactones, and the like, in the process of this invention likewise have failed. One would postulate that the thermodynamic stability of these monomeric cyclic esters which contain five atoms in the lactone ring is much greater than the corresponding polymers, and that the free energy of interconversion is exceedingly low. Proviso (c) states that the total number of organic substituents attached to the carbon atoms contained in the cyclic ester ring should not exceed four, and preferably should not exceed three. It has been observed that when the total number of organic substituents on the cyclic ester ring approached four or more, then the polymerizability of the cyclic ester monomer in the process of the invention diminished drastically. Proviso (d) states that from 2 to 4 continuously linked carbon atoms contained in the cyclic ester ring can represent a portion of a saturated cycloaliphatic hydrocarbon nucleus which contains from 4 to 10 ring carbon atoms such as, for example, a saturated cycloaliphatic hydrocarbon nucleus derived from cycloalkane, alkyl-substituted cycloalkane, cyclobutane, cyclopentane, cyclohexane, cycloheptane, cyclooctane, methylcyclopentane, methylcyclohexane, and the like. Thus, for example, the following illustrative cyclic esters would be included in this proviso:

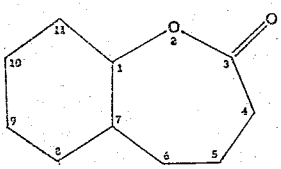

2-oxabicyclo[5.4.0]undecan-3-one (cis or trans)

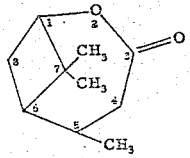

2-oxa-5,7,7-trimethylbicyclo[4.1.1]octan-3-one

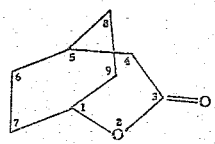

2-oxabicyclo[3.2.2]nonan-3-one

Proviso (e) states that the four R variables attached to any two adjacent carbon atoms contained in the cyclic ester ring can represent a portion of a fused aromatic hydrocarbon nucleus, that is, an aromatic nucleus derived from benzene, alkylbenzene, methylbenzene, propylbenzene, naphthalene and the like. To illustrate this proviso, the following compound is depicted structurally.

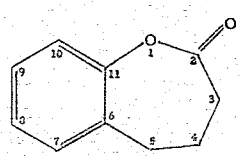

2,3,4,5-tetrahydro-2-keto-benzoxepin

In the structurally depicted compound immediately above, the four R variables which were attached to the carbon atoms designated by numerals 6 and 11 now represent a portion of the fused benzene ring, namely the carbon atoms designated by the numerals 7, 8, 9, and 10. The following compound further illustrates proviso (e).

[4] W. H. Carothers, G. L. Dorough, and F. J. van Natta, Jour. Amer. Chem. Soc., 54, 761 (1932).

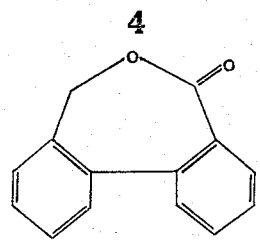

2-(2'-hydroxymethylphenyl)benzene carboxylic acid lactone

Representative monomeric cyclic esters which can be employed as starting materials in the method of the invention include, for example, beta-propiolactone, delta-valerolactone, epsilon-caprolactone, 7-hydroxyheptanoic acid lactone, 8-hydroxyoctanoic acid lactone, 12-hydroxydodecanoic acid lactone, 13-hydroxytridecanoic acid lactone, 14-hydroxytetradecanoic acid lactone, 15-hydroxypentadecanoic acid lactone, 16-hydroxyhexadecanoic acid lactone, 17-hydroxyheptadecanoic acid lactone; the alpha, alpha - dialkyl - beta - propiolactones, e.g. alpha, alpha - dimethyl - beta - propiolactone, alpha, alpha-diethyl-beta-propiolactone, alpha, alpha-dipropyl-beta-propiolactone, and the like; the monoalkyl-delta-valerolactones, e.g., the monomethyl-, monoethyl-, monoisopropyl-, monobutyl-, monohexyl-, monodecyl-, and monododecyl-delta-valerolactones and the like; the dialkyl-delta-valerolactones in which the two alkyl groups are substituted on the same or different carbon atoms in the cyclic ester ring, e.g., the dimethyl-, diethyl-, diisopropyl-, dipentyl-, and di-n-octyl-delta-valerolactones, and the like; the monoalkyl-dialkyl-, or trialkyl-epsilon-caprolactones, e.g., the monomethyl-, monoethyl-, monoisopropyl-, monohexyl-, mono-n-octyl-, dimethyl, diethyl-, di-n-propyl-, diisobutyl-, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., monomethoxy-, monoethoxy-, monoisopropoxy-, dimethoxy-, diethoxy-, and dibutoxy-delta-valerolactones and epsilon-caprolactones, and the like. Further illustrative cyclic esters include 3-ethyl-2-keto-1,4-dioxane, gamma(1-isopropyl-4-methylcyclohexyl)-epsilon-caprolactone, 3-bromo-2,3,4,5-tetrahydrobenzoxepin-2-one, 2-(2'-hydroxyphenyl)benzene carboxylic acid lactone, 10-hydroxyundecanoic acid lactone, 2,5,6,7-tetrahydrobenzoxepin-2-one, 9-oxabicyclo[5.2.2]undecan-8-one, 4-oxa-14-hydroxytetradecanoic acid lactone, alpha, alpha-bis(chloromethyl)-propiolactone, 1,4-dioxane-2-one, 3-n-propyl-2-ketone-1,4-dioxane, 3-(2-ethylhexyl)-2-keto-1,4-dioxane, and the like. Illustrative subclasses of cyclic esters which are eminently suitable in the process of the instant invention include the unsubstituted lactones and the oxalactones which contain from six to eight atoms in the lactone ring, preferably delta-valerolactone, epsilon-caprolactone, the keto-dioxanes, and the like; the mono- and polyalkyl-substituted lactones and oxalactones which contain from six to eight atoms in the lactone ring, preferably the mono- and poly-lower alkyl - delta - valerolactones, epsilon - caprolactones, and their corresponding oxalactones wherein the alkyl substituent(s) contains from 1 to 4 carbon atoms, and the like; and the mono- and polyalkoxy-substituted lactones and oxalactones which contain from six to eight atoms in the lactone ring, preferably the mono- and poly-lower alkoxy-delta-valerolactones, epsilon-caprolactones, and their corresponding oxalactones wherein the alkoxy substituent(s) contains from 1 to 4 carbon atoms.

The unsubstituted and substituted delta-valerolactones, epsilon-caprolactones, zeta-enantholactones, and higher membered lactones, e.g., mono- and polkalkyl-substituted delta-valerolactones, mono- and polyalkoxy-substituted delta-valerolactones, mono- and polycycloalkyl-substituted delta-valerolactones, aryl-substituted delta-valerolactones, mono- and polyhaloalkyl-substituted delta-valerolactones, mono- and polyalkyl-substituted epsilon-caprolactones, mono- and polyalkoxy-epsilon-caprolactones, aryl-substituted epsilon-caprolactones, mono- and polyhaloalkyl-substituted epsilon-caprolactones, mono- and polyalkyl-substituted zeta-enantholactones, and various other lactones described previously can be prepared by reacting the corresponding cyclic ketone with an anhydrous solution comprising peracetic acid and acetone. It is desirable to add the peracetic acid solution to an excess of ketone, e.g., 5 to 1 molar ratio of ketone to peracetic acid, in a still kettle maintained under reflux. The pressure can be adjusted so as to provide a kettle temperature of, for example, about 70° C. Acetone, acetic acid by-product, and minor amounts of ketone can be continuously removed throughout the addition period. Subsequently, the lactone product can be recovered from the still kettle by conventional techniques such as by distillation.

Stoll and Rouvé [5] report the preparation of lactones which cotnain up to 22 carbon atoms in the lactone nucleus by a process which comprises contacting the corresponding terminal hydroxy saturated aliphatic monocarboxylic acid with benzenesulfonic acid catalyst in boiling benzene. These authors also report the preparation of other lactones such as 14-alkyl-14-hydroxytetradecanoic acid lactone, e.g., 14-hydroxypentadecanoic acid lactone, and oxa-15-hydroxypentadecanoic acid lactone, e.g., 12 - oxa - 15 - hydroxypentadecanoic acid lactone. Palomaa and Tonkola [6] teach the preparation of 3-oxa-6-hydroxyhexanoic acid lactone by heating the corresponding terminal hydroxy saturated aliphatic monocarboxylic acid. The preparation of 2-keto-1,4-dioxane, 3-alkyl-2-keto-1,4-dioxane, polyalkoxy-substituted delta-valerolactone, mono- and polyalkyl-substituted deltavalerolactone, alkoxyalkyl-substituted delta-valerolactone, etc., is recorded by Carothers et al.[7]. The preparation of dialkyl-substituted, dihalo-substituted lactone, e.g., gamma, delta-dibromo-gamma, delta-dimethyl-delta-valerolactone is reported in the literature by Levina et al.[8]. German Pat. No. 562,827 discloses the preparation of 2,3,4,5-tetrahydrobenzoxepin-2 - one whereas the literature [9] reports the position isomer, namely 2,5,6,7-tetrahydrobenzoxepin-2-one. Cycloalkyl-substituted epsiloncaprolactone, e.g., gamma(1 - isopropyl - 4 - methylcyclohexyl)-epsilon-caprolactone is disclosed by Belov and Kheifits [10]. McKay et al.[11] have recorded the preparation of halo-substituted, haloalkyl-substituted delta-valerolactone. The literature also reports the preparation of various other cyclic esters.

The organometallics contemplated as catalysts in the process of the instant invention can be characterized by the following formula:

(II)     $R_a—M—R_b$ wherein M represents a group II metal in the periodic table, for example, beryllium, magnesium, calcium, strontium, barium, zinc, or cadmium; wherein $R_a$ represents a monovalent hydrocarbon radical, a pyridyl radical, or a furyl radical; and wherein $R_b$ represents hydrogen, halo, a monovalent hydrocarbon radical, a secondary amino radical, a hydrocarbyloxy radical, a pyridyl radical, or a furyl radical, and the like.

The monovalent hydrocarbon radicals are of any type including aliphatic, aromatic, and alicyclic radicals as exemplified by alkyl, alkenyl, cycloalkyl, cycloalkenyl, aryl, alkaryl, aralkyl, alkynyl (excluding terminal acetylenically unsaturated alkynylalkyls), and the like. More specifically, illustrative hydrocarbon radicals include, for instance, methyl, ethyl, isopropyl, n-propyl, n-butyl, t-butyl, isobutyl, sec-butyl, amyl, hexyl, isohexyl, 2-ethylhexyl, 3-methylheptyl, the octyls, the decyls, the dodecyls, the octadecyls, cyclopentyl, cyclohexyl, cycloheptyl, 2-methyl- cyclopentyl, 2-butylcyclohexyl, 3-methylcycloheptyl, vinyl, propenyl, allyl, 3-butenyl, the cyclopentenyls, the cyclohexenyls, the cycloheptenyls, the alkylcyclohexenyls, phenyl, benzyl, ortho-, meta-, and para-tolyl, the xylyls, butylphenyl, phenethyl, phenylpropyl, phenylbutyl, ethynyl, 1-butynyl, 2-butynyl, cinnamyl, naphthyl, trimethylphenyl, 9-fluorenyl, and the like. Exemplary pyridyl radicals include, for example, 2-, 3-, and 4-pyridyl, alkyl-2-pyridyl, 3-methyl-2-pyridyl, 5-ethyl-2-pyridyl, 6-n-butyl-2-pyridyl, and the like. Illustrative furyl radicals include, for instance, 2- and 3-furyl, alkyl-2-furyl, 3-methyl-2-furyl, 3-propyl-2-furyl, and the like. Illustrative secondary amino radicals encompass, for instance, dimethylamino, diethylamino, di-n-propylamino, N-ethylpropylamino, di-2-ethylhexylamino, N-ethyl-m-toluidino, N-propyl-2,3-xylidino, N-methyl-anilino, N-isopropyl-benzylamino, N-phenyl-benzylamino, N - methyl - α - naphthalamino, N-cyclohexyl-heptylamino, 1-piperidyl, 1-pyrrolidyl, 1-pyrryl, and the like. Among the hydrocarbyloxy radicals can be listed, for instance, alkoxy, aryloxy, alkenyloxy, cycloalkyloxy, cycloalkenyloxy, and the like, e.g., methoxy, ethoxy, isopropoxy, n-propoxy, n-butoxy, t-butoxy, hexoxy, 2-ethylhexoxy, octoxy, decoxy, dodecoxy, octadecoxy, phenoxy, ortho-, meta-, and para-tolyxy, 2-propylphenoxy, butylphenoxy, n-undecylphenoxy, 2-phenethoxy, benzyloxy, allyloxy, 2-butenyloxy, 2-pentenyloxy, cyclopentyloxy, cyclohexyloxy, cycloheptyloxy, alkylcyclohexyloxy, cyclopentenyloxy cyclohexenyloxy, cycloheptenylox, and the like. The halo radicals include chloro, bromo, and iodo.

Illustrative classes of organometallic catalysts which can be employed in the process of the invention include, for example, dialkylzinc, alkylzinc halide, alkylzinc alkoxide, dialkylberyllium, alkylberyllium halide, dialkylmagnesium, alkylmagnesium halide, alkylmagnesium alkoxide, alkylcycloalkylberyllium, dialkylcadmium, alkylcadmium halide, diarylzinc, diarylberyllium, diarylmagnesium, alkylzinc dialkylamide, alkylmagnesium dialkylamide, alkylcium halide, and the like. Specific examples of the organometallic catalysts include, among others, diethylzinc, di-n-propylzinc, di-n-butylzinc, di-2-ethylhexylzinc, diphenylzinc, n-butylzinc butoxide, octylzinc chloride, phenylzinc bromide, dimethylmagnesium, dipropylmagnesium, propylphenylmagnesium, n-butylmagnesium chloride, diphenylmagnesium, phenylmagnesium chloride, dimethylberyllium, diethylberyllium, dipropylberyllium, di-n-butylberyllium, propylberyllium chloride, ethycalcium iodide, dimethylcadmium, diethylcadmium, dipropylcadmium, diisobutylcadmium, diisoamylcadmium, diethylbarium, diphenylbarium, dibutylbarium, phenylcadmium iodide, diethylstrontium, butylzinc diethylamide, ethylzinc dipropylamide, phenylmagnesium diethylamide, 2-pyridylmagnesium chloride, 3-furylmagnesium iodide, 1-butynylmagnesium chloride, 2-butenylzinc ethoxide, butylzinc allyloxide, phenylmagnesium cyclohexyloxide, methylzinc cyclopentenyloxide, and the like.

The catalysts are employed in catalytically significant quantities. In general, a catalyst concentration in the range of from about 0.001, and lower, to about 10, and higher, weight percent, based on the weight of total monomeric feed, is suitable. A catalyst concentration in the range of from about 0.01 to about 3.0 weight percent is preferred. A catalyst concentration in the range of from about 0.05 to about 1.0 weight percent is highly preferred. For optimum results, the particular catalyst employed, the nature of the monomeric reagent(s), the operative conditions under which the polymerization reaction is conducted, and other factors will largely determine the desired catalyst concentration.

The polymerization reaction can be conducted over a wide temperature range. Depending upon various factors such as the nature of the monomeric reagent(s) employed, the particular catalyst employed, the concentration of the catalyst, and the like, the reaction temperature can be as low as —20° C., and lower, and as high as

[5] Helv. Chim. Acta, 18, 1087 (1935).
[6] Ber., 66, 1629 (1933).
[7] See footnote 1.
[8] Zhur. Obshchei Khim, 24, 1439 (1954).
[9] Ber., 68B, 1170 (1935).
[10] J. Gen. Chem. USSR, 27, 1459 (1957).
[11] J. Amer. Chem. Soc., 77, 5601–6 (1955).

250° C., and higher. A suitable temperature range is about 0° to about 225° C. A reaction temperature in the range of from about 10° to about 200° C. is preferred.

The polymerization reaction preferably occurs in the liquid phase, and to this extent sufficient pressure is employed to maintain an essentially liquid reaction mixture regardless whether or not an inert normally-liquid organic vehicle is employed. Preferably, the polymerization reaction is conducted under an inert atmosphere, e.g., nitrogen, butane, helium, etc. The ultimate molecular weight of the resulting polymer will depend, to an extent, upon various factors such as the temperature, the choice and concentration of the catalyst, the use and amount of an inert normally-liquid organic vehicle(s), and the like.

In general, the reaction time will vary depending on the operative temperature, the nature of the monomeric cyclic esters employed, the particular catalyst and the concentration employed, the use of an inert normally-liquid organic vehicle, and other factors. The reaction time can vary from several seconds to several hours, or more, depending on the variables illustrated above.

It is preferred to conduct the polymerization reaction in the essential absence of impurities which contain active hydrogen since the presence of such impurities tends to deactivate the catalyst and/or increase the induction period. The minimization or essential avoidance of impurities such as water, carbon dioxide, aldehydes, ketones, etc., is highly desirable. It is also preferred that the polymerization reaction be conducted under substantially anhydrous conditions.

When polymerizing an admixture containing at least two different cyclic esters, the proportions of said cyclic esters can vary over the entire range. Broadly the concentration of each monomeric cyclic ester is in the range of from about 3 to about 97 weight percent, based on the total weight of said cyclic esters. The preferred range is from about 15 to about 85 weight percent. Admixtures containing epsilon-caprolactone and mono- and/or polyalkyl-substituted epsilon-caprolactone (including isomeric mixtures thereof) are highly preferred as starting materials in the process of the invention since said starting materials are economical, the resulting polymers exhibit extraordinary and outstanding thermal stability and excellent low temperature performance, and the average molecular weights of the resulting polymers are oftentimes several-fold greater than heretofore obtainable by prior art methods. For similar reasons admixtures containing different mono- and/or polyalkyl-substituted epsilon-caprolactones (including isomeric mixtures of the same and/or different mono- and/or polyalkyl-substituted epsilon-caprolactones) also are highly preferred.

The polymers of this invention can be prepared via the bulk polymerization, suspension polymerization, or the solution polymerization routes. The polymerization reaction can be carried out in the presence of an inert normally-liquid organic vehicle such as, for example, aromatic hydrocarbons, e.g., benzene, toluene, xylene, ethylbenzene, and the like; various oxygenated organic compounds such as anisole, the dimethyl and diethyl ethers of ethylene glycol, of propylene glycol, of diethylene glycol and the like; normally-liquid saturated hydrocarbons including the open chain, cyclic, and alkyl-substituted cyclic saturated hydrocarbons such as hexane, heptane, various normally-liquid petroleum hydrocarbon fractions, cyclohexane, the alkylcyclohexanes, decahydronaphthalene, and the like. If desired, a mixture of mutually miscible inert normally-liquid organic vehicles can be employed.

The process of the invention can be executed in a batch, semi-continuous, or continuous fashion. The reaction vessel can be a glass vessel, steel autoclave, elongated metallic tube, or other equipment and material employed in the polymer art. The order of addition of catalyst and monomeric reagent(s) does not appear to be critical. A suitable procedure is to add the catalyst to the reaction zone containing the monomeric reagent(s) and inert organic vehicle, if any. If desired, the catalyst can be in solution or suspension (in an inert normally-liquid organic vehicle). Incremental addition of catalyst to the reaction zone can be employed. If desired, the above procedure can be reversed, that is, the monomeric reagent(s) per se or as a solution in an inert organic vehicle can be added to the reaction zone containing the catalyst (or a catalyst solution). Also, the catalyst, reagent(s), and inert organic vehicle, if any, can be added to the reaction zone simultaneously. The reaction zone (be it a closed vessel or an elongated tube) can be fitted with an external heat exchanger to thus control undue temperature fluctuations, or to prevent any possible "runaway" reaction temperatures due to the exothermic nature of the reaction. In a continuous operation employing as the reaction zone an elongated tube or conduit, the use of one or a plurality of separate heat exchangers can be conveniently used. In a batch operation, stirring means can be provided for agitating the reaction mixture, as desired.

Unreacted monomeric reagent oftentimes can be recovered from the reaction product by conventional techniques such as by heating said reaction product under reduced pressure. Removal of unreacted monomeric reagent(s) and/or inert organic vehicle can be accomplished by mechanical means such as treatment of the reaction product in a Marshall mill and the like. The polymer product also can be recovered from the reaction product by washing said reaction product with an inert normally-liquid organic vehicle, e.g., heptane, and subsequently drying same under reduced pressure at slightly elevated temperatures. Another route involves dissolution in a first inert organic vehicle, followed by the addition of a second inert organic vehicle which is miscible with the first vehicle but which is a non-solvent for the polymer product, thus precipitating the polymer product. If desired, the reaction product can be dissolved in an inert organic vehicle such as acetone, and the like, followed by the addition of sufficient water to the resulting solution, said water being miscible with said inert organic vehicle but being a non-solvent for the water-insoluble polymer thereby precipitating the polymer product. Recovery of the precipitated polymer can be effected by filtration, decantation, etc., followed by drying same as indicated previously. The reaction product also can be contacted with an inert organic solution of, for instance, a saturated aliphatic carboxylic acid anhydride, e.g., acetic anhydride, and an alkali metal alkanoate, e.g., sodium acetate, to thus convert the polymeric end group to an alkanoate group, e.g., acetate group. It is observed that this technique of treating the polymer product imparts desirable properties thereto such as increasing the thermal stability of the treated polymer product. If desired, the polymer product also can be freed of catalyst residue, if any, by extraction with dilute mineral acid such as hydrochloric acid or sulfuric acid.

The linear polyester products resulting from the process of the invention can be characterized by the following recurring structural unit:

III 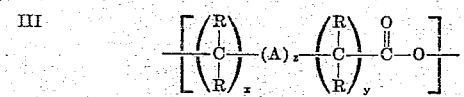

wherein the variables R, A, $x$, $y$, and $z$, have the same values as shown in Formula I supra. Of course, the five provisos enumerated as (a) through (e) set forth in the discussion of Formula I supra likewise apply to the structural unit designated as Formula III above. In addition, as indicated previously, the molecular weights of the polyester products can range from about several hundred to about several hundred thousand, e.g., from about 900 to about 250,000, and higher. The ultimate molecular weight and properties of the polyester products will depend, in the main, upon the choice of the cyclic ester(s)

and catalyst, the concentration of the catalyst, the operative conditions employed, e.g., temperature, etc., the purity of the monomeric reagent(s) and catalyst, the use and amount of an inert normally-liquid organic vehicle, and the like.

It is readily apparent that the linear homopolymers are essentially characterized by the same recurring unit which falls within the scope of Formula III supra. The copolymers, terpolymers, etc., on the other hand, can contain as little as 1.0 weight percent, and lower, and upwards to 99 weight percent, and higher, of the same recurring unit. Desirable polymers are those in which the weight percent of the different recurring units is in the range of from about 3 to about 97. In the highly preferred copolymers the weight per cent of the two different recurring units is in the range of from about 15 to about 85.

The polymers obtained by the process of the invention are a useful class of polyester compounds. These polymers can range from viscous liquids to extremely tough, crystalline solids. The very viscous liquids to relatively low molecular weight, wax-like products are useful in the preparation of cosmetics, polishes, and waxes, and as thickening agents for various lubricants. The polymers can be employed to size cellulosic material or they can be used as anti-static agents in the treatment of fibrous materials. They can also be employed as protective coatings and impregnants. These polymers are also useful as oil additives. The solid polymers are useful for the production of various shaped articles such as brush handles, buttons, lamp bases, toys, and the like. The crystalline polymers can be shaped into useful fibers by conventional means such as by extrusion. The solid crystalline and non-crystalline polymers also are useful in the preparation of films by such techniques as milling on a two-roll mill, calendering, solvent casting, and the like. The polymers are also useful as plasticizers for vinyl resins.

It should be noted, also, that an additional advantage afforded by the practice of the invention is the preparation of copolymers, terpolymers, etc., whose physical characteristics can be "tailor-made" to fit desired fields of applications and uses. In other words, by adjusting the concentration of the monomeric charge to a particular polymerization system, copolymers, terpolymers, etc., which cover a wide spectrum of properties and characteristics can be prepared, e.g., soft, rubbery polymers to highly crystalline polymers.

In a highly preferred embodiment, the invention also contemplates the preparation of novel polyesters which result from the polymerization of one cyclic ester or an admixture of at least two different cyclic esters, said cyclic ester(s) having the following formula:

(IV) 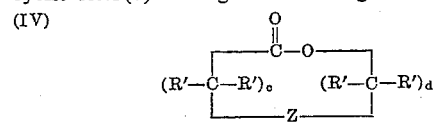

wherein each R′, individually, can be hydrogen, alkyl, alkoxy, and alkoxyalkyl; wherein subscripts $c$ and $d$, individually, are integers having a value greater than zero and less than 4; wherein the sum of $c$ plus $d$ is a whole number greater than 2 and less than 6, preferably greater than 2 and less than 5; and where Z is an oxy group, i.e., —O— group, or the unit

wherein the R′ variables of said unit have the same values as above; with the provisos (1) that no more than three R′ variables attached to the carbon atoms contained in the cyclic ester ring are groups other than hydrogen, (2) that from 2 to 4 continuously linked carbon atoms contained in the cyclic ester ring can represent a portion of a saturated cycloaliphatic hydrocarbon nucleus which contains from 4 to 10 carbon atoms in said nucleus, preferably from 5 to 7 carbon atoms in said nucleus, and (3) that four R′ variables attached to any two adjacent carbon atoms contained in the cyclic ester ring can represent a portion of a fused aromatic hydrocarbon nucleus. With reference to proviso (2) immediately above, the saturated cycloaliphatic hydrocarbon nucleus can be considered to be derived, for example, from cycloalkane, alkyl-substituted cycloalkane, cyclobutane, cyclopentane, ethylcyclohexane, n-propylcyclohexane, n-octylcyclohexane, cycloheptane, cyclooctane, and the like. With reference to proviso (3) immediately above, the aromatic hydrocarbon nucleus can be considered to be derived, for example, from benzene, alkylbenzene, ethylbenzene, n-propylbenzene, 2-ethylhexylbenzene, naphthalene, alpha-methylnaphthalene, and the like. Specific illustrative radicals falling within the scope of the R′ variables of Formula IV are found under the discussion of the R variables of Formula I supra.

The novel linear polyesters are characterized by the following recurring unit:

(V) 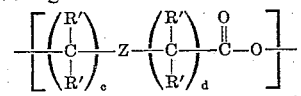

wherein the variables R′, Z, $c$, and $d$, have the same values as set forth in Formula IV supra (including the three enumerated provisos).

The novel linear polymers encompassed with the scope of Formula V supra are further characterized by their reduced viscosity value ranges. Those novel linear homopolymers, the chain of the recurring unit thereof being composed of carbon atoms and an ester group, i.e.,

have a reduced viscosity value in the range of from about 0.7 to about 15, and higher, preferably from about 1.0 to about 7.0, and preferably still from about 1.2 to about 5.0, as determined at a concentration of 0.2 gram of homopolymer per 100 milliliters of chloroform at 30° C. To illustrate the various novel linear homopolymers contemplated, the following recurring units are set forth structurally below.

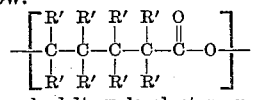

A poly-delta-valerolactone unit

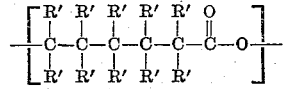

A poly-epsilon-caprolactone unit

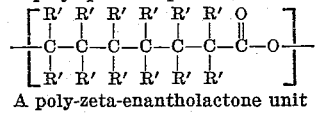

A poly-zeta-enantholactone unit

The novel linear oxalactone homopolymers, e.g., those in which the chain of the recurring unit is composed of an ester group

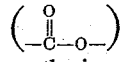

carbon atoms, and one etheric oxygen group (—O—) which is at least one carbon atom removed from the ester group, have a reduced viscosity value in the range of from about 0.25 to about 3.0, and higher, preferably from about 0.3 to about 2.0, as determined at a concentration of 0.4 gram of homopolymer per 100 milliliters of chloroform at 30° C. To illustrate the various linear oxalactone homopolymers contemplated, the following recurring units are structurally depicted below.

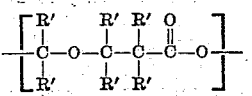

A poly-4-keto-m-dioxane unit

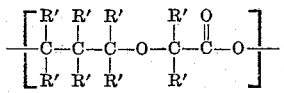

A poly-3-oxa-6-hydroxyhexanoic acid lactone unit

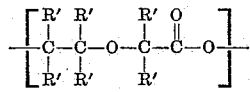

A poly-2-keto-1,4-dioxane unit

It is readily appreciated that the novel linear copolymers, terpolymers, etc., are characterized by the recurring unit shown in Formula V supra. These novel linear copolymers, terpolymers, etc., are further characterized by a reduced viscosity value in the range of from about 0.5 to about 7.0, and higher, preferably from about 0.8 to about 5.0, and preferably still from about 1.0 to about 4.0, as determined at a concentration of 0.4 gram of polymer per 100 milliliters of chloroform at 30° C.

In summary, therefore, the novel linear polyesters encompassed within the scope of the recurring unit designated as Formula V supra include the homopolymers of the unsubstituted and substituted lactones and oxalactones, e.g., the delta-valerolactones, the oxa-delta-valerolactones, the epsilon-caprolactones, the oxa-epsilon-caprolactones, the zeta-enantholactones, the oxa-zeta-enantholactones, and the like, and polymers obtained by reacting an admixture of at least two of the above-enumerated cyclic esters.

The novel linear polymers which are obtained by the practice of the invention are an extremely useful class of compounds revealing significant and unobvious results in several fields of applications as will become apparent from a consideration of the operative examples. These novel polymers when incorporated as binders into "green" linoleum impart numerous desirable characteristics to the eventually compounded linoleum. The novel polymers, in addition, can be employed as adhesives for vinyl resin sheets, e.g., poly-(vinyl chloride), and the resulting bonded sheets of vinyl resins reveal an Izod impact value far greater than the vinyl resin sheets bonded by heat and pressure alone. As plasticizers, the novel polymers impart astounding and unexpected properties and characteristics to vinyl resins, particularly vinyl halide resins. The incorporation of the novel polymers into vinyl results in a plasticized composition which exhibits excellent flexibility at temperatures below 0° C. and extraordinarily low brittle temperatures of −65° C., and lower. In addition, the plasticized compositions exhibit very low volatility and extremely high resistance to oil and water extraction. Moreover, films prepared from the vinyl resins which are plasticized with the novel polymers are tougher and more extensible than films prepared from the same vinyl resins which are plasticized with conventional plasticizers, e.g., dioctyl phthalate, or the corresponding low molecular weight polyester. It should be borne in mind that the above enumerated unexpected and unobvious results which are achieved by virtue of the employment of the novel polyesters in various fields of applications are also manifest when compared to the use of the corresponding relatively low molecular weight polyester in the same fields of applications under substantially similar conditions.

In the illustrative operative examples to follow the polymeric product oftentimes is described as possessing a certain reduced viscosity value. By this term, i.e., "reduced viscosity," is meant a value obtained by dividing the specific viscosity by the concentration of the polymer in the solution, the concentration being measured in grams of polymer per 100 milliliters of solvent at a given temperature. The specific viscosity is obtained by dividing the difference between the viscosity of the solution and the viscosity of the solvent by the viscosity of the solvent. The reduced viscosity value is an indication of the molecular weight of the polymer. Unless otherwise indicated, the reduced viscosity value was determined at 30° C.

Also, in the illustrative operative example below, the polymerization reaction was generally conducted under an inert atmosphere, e.g., nitrogen. The reaction vessel and contents, i.e., cyclic ester(s), catalyst, and inert organic vehicle, if any, were maintained, usually under agitation, in a constant temperature, e.g., 90 C., or the reaction vessel containing the cyclic ester(s) was maintained, usually under agitation, in a constant temperature and subsequently the catalyst was added thereto. Since the polymerization reaction, in general, was exothermic a rise in temperature was observed, e.g., 140° to 150° C. In several instances the period recorded was the time observed in which the rotation of the mechanical stirrer ceased due to the high viscosity of the contents in the reaction vessel. In most cases the reaction vessel was left in the constant temperature bath for an additional period of time, e.g., about 20 minutes, or longer. Unless otherwise indicated, the examination or description of the polymeric product was conducted at room temperature, i.e., about 23° C. In general, the conversion of monomer to polymer was substantially quantitative.

EXAMPLE 1

A. To a reaction vessel maintained under a nitrogen atmosphere and which contained epsilon-caprolactone, there was charged methylmagnesium bromide in an amount so as to give an admixture containing 0.5 weight percent methylmagnesium bromide, based on the weight of said epsilon-caprolactone. The reaction vessel then was placed in a constant temperature bath maintained at 90° C. Within one minute the mechanical stirrer ceased due to the high viscosity of the contents in the reaction vessel. Thereafter, the polymeric product was recovered. There was obtained a hard solid homopolymer which possessed a reduced viscosity value of 0.62 (measured at 0.2 gram of polymer in 100 ml. of benzene).

B. In an analogous manner as above, when 8-hydroxyoctanoic acid lactone is substituted for epsilon-caprolactone and contacted with 1.0 weight percent n-butylmagnesium butoxide, there is obtained a hard, water-insoluble solid polymer.

EXAMPLE 2

A. To a reaction vessel maintained under a nitrogen atmosphere and which contained epsilon-caprolactone, there was charged n-butylmagnesium chloride in an amount so as to give an admixture containing 0.5 weight percent n-butylmagnesium chloride, based on the weight of said epsilon-caprolactone. After standing for 4 hours at room temperature, the reaction mixture became very viscous. After standing overnight, a solidified mass was recovered from the reaction vessel. The poly-epsilon-caprolactone product was a tough, white, fiber-forming solid which had a reduced viscosity of 0.97 (measured at 0.2 gram of polymer in 100 ml. of benzene).

B. In an analogous manner as above, when 13-hydroxytridecanoic acid lactone is substituted for epsilon-caprolactone and contacted with 0.8 weight percent diphenylzinc, there is obtained a hard, water-insoluble solid polymer.

EXAMPLE 3

A. To a reaction vessel maintained under a nitrogen atmosphere and which contained epsilon-caprolactone, there was charged n-butylmagnesium chloride in an amount so as to give an admixture containing 0.46 weight percent n-butylmagnesium chloride, based on the weight of said epsilon-caprolactone. The reaction vessel then was placed in a constant temperature bath maintained at 90° C. Within one minute the mechanical stirrer ceased due to the high viscosity of the contents in the reaction vessel. Subsequently, the polymeric product was recovered. There was obtained a tough, white, fiber-forming polymer which possessed a reduced viscosity value of 1.1 (measured at 0.4 gram of polymer in 100 ml. of chloroform).

B. In an analogous manner as above, when an isomeric mixture of ethyl-delta-valerolactones are substituted for epsilon-caprolactone and contacted with 1.0 weight percent di-2-ethylhexylzinc, there is obtained a very viscous liquid product.

EXAMPLE 4

A. To a reaction vessel maintained under a nitrogen atmosphere and which contained epsilon-caprolactone, there was charged di-n-butylzinc in an amount so as to give an admixture containing 0.5 weight percent di-n-butylzinc, based on the weight of said epsilon-caprolactone. The reaction mixture became very viscous after standing for 4 hours exposed to room temperature conditions. Upon standing overnight, a solidified mass was recovered from the reaction vessel. There was obtained a tough, white, fiber-forming solid homopolymer which possessed a reduced viscosity value of 0.75 (measured at 0.2 gram of polymer in 100 ml. of benzene).

B. In an analogous manner as above, when beta, gamma-dimethoxy-delta valerolactone is substituted for epsilon-caprolactone and contacted with 1.0 weight percent phenylcadmium iodide, there is obtained a solid polymer.

EXAMPLES 5–9

In Examples 5 through 9, epsilon-caprolactone was contacted with di-n-butylzinc in a manner similar to that set forth immediately preceding the operative examples. The data and results are described in Table I below.

Table I

| Ex. No. | Catalyst concentration[1] | Temp., °C.[2] | Time, min.[3] | Reduced viscosity[4] | Description of polyester |
|---|---|---|---|---|---|
| 5 | 1.0 | 50–110 | Rapid | | Tough, white, fiber-forming solid. |
| 6 | 0.49 | 70 | 10 | 0.49 | Do. |
| 7 | 0.50 | 90 | 8 | 0.94 | Do. |
| 8 | 0.50 | 90 | 3 | 0.97 | Do. |
| 9 | 0.33 | 150 | <1 | 0.75 | Do. |

[1] Weight percent catalyst, based on weight of epsilon-caprolactone.
[2] Initial temperature; peak temperature higher due to exothermic nature of reaction.
[3] Time in minutes for mechanical stirrer to stop due to high viscosity of reaction mixture.
[4] Measured at 0.2 gram per 100 ml. of benzene at 30° C.

EXAMPLE 10

A. To a reaction vessel maintained under a nitrogen atmosphere and which contained epsilon-caprolactone, there was charged diisobutylzinc in an amount so as to give an admixture containing 0.5 weight percent diisobutylzinc, based on the weight of said epsilon-caprolactone. The reaction vessel then was placed in a constant temperature bath maintained at 90° C. Within 3 minutes the mechanical stirrer ceased due to the high viscosity of the contents in the reaction vessel. Thereafter, the polymeric product was recovered. There was obtained a tough, white, fiber-forming homopolymer which possessed a reduced viscosity value of 0.84 (measured at 0.2 gram of polymer in 100 ml. of benzene).

B. In an analogous manner as above, when 2-pyridylmagnesium chloride is substituted for diisobutylzinc in an amount so as to give an admixture which contains 1.0 weight percent of 2-pyridylmagnesium chloride, based on the weight of epsilon-caprolactone, essentially the same results are obtained.

EXAMPLE 11

A. To a reaction vessel maintained under a nitrogen atmosphere and which contained epsilon-caprolactone, there was charged dimethylcadmium in an amount so as to give an admixture containing 0.4 weight percent dimethylcadmium, based on the weight of said epsilon-caprolactone. The reaction mixture then was allowed to stand, at room temperature, for a period of about 3 days. Thereafter, the reaction product was recovered from the reaction vessel, dissolved in chloroform, and reprecipitated in petroleum ether. There was obtained a tough, white, fiber-forming solid which possessed a reduced viscosity value of 1.38 (measured at 0.4 gram of polymer in 100 ml. of chloroform).

B. In an analogous manner as above, when gamma(1-isopropyl-4-methylcyclohexyl)-epsilon-caprolactone is substituted for epsilon-caprolactone and contacted with 1.0 weight percent dimethylmagnesium, a viscous liquid product is obtained.

EXAMPLE 12

A. To a reaction vessel maintained under a nitrogen atmosphere and which contained epsilon-caprolactone, there was charged dimethylcadmium in an amount so as to give an admixture containing 0.8 weight percent dimethylcadmium, based on the weight of said epsilon-caprolactone. The reaction vessel then was placed in a constant temperature bath maintained at 90° C. Within 4 minutes the mechanical stirrer ceased due to the high viscosity of the contents in the reaction vessel. Thereafter, the reaction product was recovered from the reaction vessel, dissolved in chloroform, and reprecipitated in petroleum ether. There was obtained an extremely tough, crystalline homopolymer which possessed a reduced viscosity value of 1.95 (measured at 0.4 gram of polymer in 100 ml. of chloroform).

B. In an analogous manner as above, when gamma-methyl-delta-isopropyl-epsilon-caprolactone is substituted for epsilon-caprolactone and contacted with 1.0 weight percent butylzinc diethylamide, there is obtained a hard, water-insoluble solid polymer.

EXAMPLES 13–18

In Examples 13 through 18 epsilon-caprolactone was contacted with dimethylcadmium or di-n-butylcadmium, as indicated, in a manner similar to that set forth immediately preceding the operative examples. The data and results are described in Table II below.

Table II

| Ex. No. | Catalyst | Catalyst concentration[1] | Temperature, °C. | Time, min. | Reduced viscosity | Description of polyester |
|---|---|---|---|---|---|---|
| 13 | Dimethylcadmium | 0.4 | 90 | 4 | [2][5] 2.49 | Extreme tough, crystalline solid. |
| 14 | do | 0.2 | 90 | 7 | [2][4][6] 5.0 [2][5][7] 6.5 | Do. |
| 15 | do | 0.2 | 90 | 1 | [2][5] 0.73 | Do. |
| 16 | Di-n-butylcadmium | 0.5 | [8] 23 | 120 | [3][4] 0.87 | Tough, gray, fiber-forming solid. |
| 17 | do | 0.5 | 90 | 1 | [3][4] 1.17 | Do. |
| 18 | do | 0.83 | 90 | 4 | [3][4] 2.88 | Do. |

[1] Weight percent catalyst, based on weight of epsilon-caprolactone.
[2] Determined at 0.4 gram of polymer in 100 ml. of chloroform at 30° C.
[3] Determined at 0.2 gram of polymer in 100 ml. of benzene at 30° C.
[4] Reaction product dissolved in acetone and reprecipitated in water.
[5] Reaction product dissolved in chloroform and reprecipitated in petroleum ether.
[6] Soluble in acetone.
[7] Insoluble in acetone; soluble in choroform.
[8] Approx.

EXAMPLE 19

A. To a reaction vessel maintained under a nitrogen atmosphere and which contained an isomeric mixture of methyl-epsilon-caprolactone, there was charged n-butylmagnesium chloride in an amount so as to give an admixture containing 0.5 weight percent n-butylmagnesium chloride, based on the total weight of methyl-epsilon-caprolactone. The isomeric mixture contained, by weight, approximately 30 percent gamma-methyl-epsilon-caprolactone, about 30 percent epsilon-methyl-epsilon-caprolactone, and about 40 percent beta-methyl- and delta-methyl-epsilon-caprolactone. This isomeric lactone mixture was prepared by reacting a mixture of 2-methyl-, 3-methyl-, and 4-methylcyclohexanone with peracetic acid. The reaction vessel then was placed in a constant temperature bath maintained at 90° C. Within one minute the mechanical stirrer ceased due to the high viscosity of the contents in the reaction vessel. Thereafter, the polymeric product was recovered. There was obtained a homopolymer which possessed a reduced viscosity value of 0.26 (measured at 0.2 gram of polymer in 100 ml. of benzene).

B. In an analogous manner as above, when 2-bromo-2-(3'-bromopropyl)-5-hydroxypentanoic acid lactone is substituted for the isomeric mixture of methyl-epsilon-caprolactones and contacted with 1.0 weight percent 2-butenylzinc butoxide, a viscous liquid product is obtained.

EXAMPLES 20–27

In Examples 20 through 27 the lactone monomer was contacted with the catalyst in a manner similar to that set forth immediately preceding the operative examples. The pertinent data and results are shown in Table III below.

EXAMPLE 28

A. To a reaction vessel maintained under a nitrogen atmosphere and which contained beta,gamma-dimethyl-epsilon-caprolactone, there was charged di-n-butylzinc in an amount so as to give an admixture containing 1.0 weight percent di-n-butylzinc, based on the weight of said beta,gamma-dimethyl-epsilon-caprolactone. The reaction vessel then was placed in a constant temperature bath maintained at 90° C. After 144 minutes the mechanical stirrer ceased due to the high viscosity of the contents in the reaction vessel. Thereafter, the polymeric product was recovered which had a reduced viscosity value of 0.14 (measured at 0.2 gram of polymer in 100 ml. of benzene).

B. In an analogous manner as above, when 2,3,4,5-tetrahydrobenzoxepin-2-one is substituted for beta,gamma-dimethyl-epsilon-caprolactone and contacted with 1.0 weight percent propylberyllium chloride, there is obtained a solid polymer.

EXAMPLE 29

A. To a reaction vessel maintained under a nitrogen atmosphere and which contained delta-valerolactone, there was charged phenylmagnesium bromide in an amount so as to give an admixture containing 0.5 weight percent phenylmagnesium bromide, based on the weight of said delta-valerolactone. The reaction vessel then was placed in a constant temperature bath maintained at 90° C. Within one minute the mechanical stirrer ceased due to the high viscosity of the contents in the reaction vessel. Thereafter, the polymeric product was recovered. There was obtained a tough, crystalline, fiber-forming, solid homopolymer which possessed a reduced viscosity value of 0.76 (measured at 0.4 gram of polymer in 100 ml. of chloroform).

B. In an analogous manner as above, when 3-ethyl-2-keto-1,4-dioxane is substituted for delta-valerolactone and contacted with 1.0 weight percent 3-furylmagnesium iodide, a very viscous liquid product is obtained.

*Table III*

| Ex. No. | Epsilon-caprolactone | Catalyst | Catalyst concentration [3] | Temp. °C. | Time, min. | Reduced viscosity [4] |
|---|---|---|---|---|---|---|
| 20 | Mixed methyl [1] | $(n-C_4H_9)_2Mg$ | 0.5 | 90 | 1 | 0.31 |
| 21 | do.[1] | $(n-C_4H_9)_2Zn$ | 0.68 | 70 | 33 | 0.47 |
| 22 | do.[1] | $'n-C_4H_9)_3Zn$ | 0.34 | 90 | 14 | 0.48 |
| 23 | do.[1] | $(n-C_4H_9)_2Zn$ | 0.50 | 90 | 18 | 0.43 |
| 24 | do.[1] | $(n-C_4H_9)Zn(OC_4H_9)$ | 0.50 | 90 | 10 | 0.28 |
| 25 | Gamma-methyl | $(n-C_4H_9)_2Zn$ | 1.0 | 90 | 41 | 0.13 |
| 26 | Epsilon-methyl | $(n-C_4H_9)_2Zn$ | 2.0 | 90, 180 | 200 | 0.06 |
| 27 | Mixed-octyl [2] | $(n-C_8H_{17})MgBr$ | 0.5 | 90 | 10 | |

[1] An isomeric mixture containing 30 weight percent gamma-methyl-, 30 weight percent epsilon-methyl-, and 40 weight percent of beta-methyl- and delta-methyl-caprolactones.
[2] An isomeric mixture containing a major proportion by weight of gamma-octyl- and a minor proportion by weight of epsilon-octyl-epsilon-caprolactones.
[3] Weight percent catalyst, based on the total weight of lactone feed.
[4] Determined at a concentration of 0.2 gram of polymer in 100 ml. of benzene.

EXAMPLES 30–34

In Examples 30 through 34 delta-valerolactone were contacted with various catalysts in a manner similar to that set forth immediately preceding the operative examples. The pertinent data and results are shown in Table IV below.

*Table IV*

| Ex. No. | Catalyst | Catalyst concentration [1] | Temp. °C. | Time, min. | Reduced viscosity | Description of polyester |
|---|---|---|---|---|---|---|
| 30 | $(n-C_8H_{17})MgBr$ | 0.5 | 90 | 1 | [2] 0.78 | Tough, crystalline solid. |
| 31 | $(n-C_4H_9)_2Zn$ | 0.5 | 60 | 3 | [3][4] 0.72 | Do. |
| 32 | $(n-C_4H_9)_2Zn$ | 0.5 | 120 | 1 | [3] 0.78 | Do. |
| 33 | $(n-C_4H_9)_2Zn$ | 0.05 | 90 | 1.5 | [2] 2.44 | Tough, crystalline, fiber-forming solid. |
| 34 | $(n-C_4H_9)_2Cd$ | 0.5 | 90 | 2.5 | [2] 1.36 | Tough, crystalline solid. |

[1] Weight percent catalyst, based on the weight of delta-valerolactone.
[2] Measured at 0.4 gram of polymer in 100 ml. of chloroform.
[3] Measured at 0.2 gram of polymer in 100 ml. of benzene.
[4] Milled sample had a reduced viscosity value of 0.3.

EXAMPLE 35

A. To a reaction vessel maintained under a nitrogen atmosphere and which contained beta-methyl-delta-valerolactone (redistilled, boiling point 137° C. at 1.5 mm. of Hg; $n_D^{31}$ of 1.4480) there was charged di-n-butylzinc in an amount so as to give an admixture containing 1.0 weight percent di-n-butylzinc, based on the weight of said beta-methyl-delta-valerolactone. The reaction vessel then was placed in a constant temperature bath maintained at 90° C. Within 15 minutes the mechanical stirrer ceased due to the high viscosity of the contents in the reaction vessel. Thereafter, the polymeric product was recovered. There was obtained a very viscous, clear liquid which possessed a reduced viscosity value of 0.11 (measured at 0.2 gram of polymer in 100 ml. of benzene).

B. In an analogous manner as above, when 3-oxa-6-hydroxy-hexanoic acid lactone is substituted for beta-methyl-delta-valerolactone and contacted with 0.6 weight percent ethylcalcium iodide, there is obtained a solid polymer.

EXAMPLES 36–38

In Examples 36 through 38, various copolymers were prepared by polymerizing an admixture of two lactones in the presence of di-n-butylzinc. The procedure employed was similar to that set forth immediately preceding the operative examples. The pertinent data and results are recorded in Table V below.

EXAMPLE 39

A. To a reaction vessel maintained under a nitrogen atmosphere and which contained zeta-enantholactone, there was charged di-n-butylxinc in an amount so as to give an admixture containing 0.5 weight percent di-n-butylzinc based on the weight of said zeta-enantholactone. The reaction vessel then was placed in a constant temperature bath maintained at 90° C. Within 30 minutes the mechanical stirrer ceased due to the high viscosity of the contents in the reaction vessel. Thereafter, the polymeric product was recovered. There was obtained a tough, white, film-forming solid homopolymer which possessed a reduced viscosity value of 0.63 (measured at 0.2 gram of polymer in 100 ml. of benzene).

B. In an analogous manner as above, when 10-hydroxyundecanoic acid lactone is substituted for zeta-enantholactone and contacted with 0.7 weight percent dibutylbarium, essentially similar results are obtained.

EXAMPLES 40–42

In Examples 40 through 42 the procedure employed was similar to that set forth immediately preceding the operative examples. The pertinent data and results are recorded in Table VI below.

Table VI

| Ex. No | Lactone charge [1] | Catalyst | Catalyst concentration [2] | Temp. °C. | Time, min. | Reduced viscosity [3] | Description of polyester |
|---|---|---|---|---|---|---|---|
| 40 | Zeta-enantholactone | $(n\text{-}C_4H_9)_2Cd$ | 0.50 | 25 | >30 | 0.41 | Tough, white solid. |
| 41 | 30 zeta-enantholactone/70 epsilon-caprolactone | $(n\text{-}C_4H_9)_2Zn$ | 0.50 | 90 | 5 | 0.55 | Do. |
| 42 | 20 zeta-enantholactone/80 epsilon-caprolactone | $(n\text{-}C_4H_9)_2Zn$ | 0.50 | 90 | 3 | 0.91 | Tough, white, fiber-forming solid. |

[1] Admixture of two lactones is expressed as parts by weight.
[2] Weight percent catalyst, based on total weight of lactone charge.
[3] Measured at 0.2 gram of polymer in 100 ml. of benzene.
NOTE.—Zeta-enantholactone redistilled; B.P. 72° C. at 4 mm. of Hg; $n_D^{30}$ of 1.4689.

EXAMPLE 43

A solution of 20 grams of beta-propiolactone in 300 milliliters of heptane was heated under gentle reflux while 50 milliliters of said heptane was removed. Di-n-butylzinc (0.10 gram) was added, and the resulting solution was stirred at 95° C. for a period of 18 hours. The reaction product then was dissolved in chloroform and reprecipitated from petroleum ether. There was obtained 13 grams of a white powder with a melting point of 87°–94° C. and a neutral equivalent of 2100.

Table V

| Ex. No. | Lactone charge [1] | Catalyst concentration [2] | Temp. °C. | Time, min. | Viscosity [3] | Description of copolymer |
|---|---|---|---|---|---|---|
| 36 | 70 epsilon-caprolactone/30 beta-methyl-delta-valerolactone | 0.5 | 90 | 2 | [4] 0.86 | Soft, tough solid. |
| 37 | 80 epsilon-caprolactone/ 20 beta-methyl-delta valerolactone | 0.5 | 90 | 2 | [5] 0.78 | Tough, white film-forming solid. |
| 38 | 85 epsilon-caprolactone/15 beta-methyl-delta-valerolactone | 0.5 | 90 | 8 | 0.40 | White, waxy solid. |

[1] Parts by weight.
[2] Weight percent catalyst, based on total weight of lactone charge.
[3] Measured at 0.2 gram of copolymer in 100 ml. of benzene.
[4] Dissolved in chloroform and reprecipitated from petroleum ether.
[5] Milled.
NOTE.—Beta-methyl-delta-valerolactone redistilled; B.P. 137° C. at 1.5 mm. of Hg; $n_D^{31}$ of 1.4480.

EXAMPLES 44–50

In Examples 44 through 50, 2-keto-1,4-dioxane was contacted with dimethylcadmium or di-n-butylcadmium in a manner similar to that set forth immediately preceding the operative examples. The pertinent data and results are described in Table VII below.

Table VII

| Ex. No.[1] | Catalyst | Catalyst concentration [2] | Temp. °C. | Time, min. | Reduced viscosity | Description of polyester |
|---|---|---|---|---|---|---|
| 44 | $(n\text{-}C_4H_9)_2Zn$ | 0.2 | 90 | 1 | [3] 0.13 | Slightly tough, brittle solid; M.P. of 105°–108° C. |
| 45 | $(n\text{-}C_4H_9)_2Zn$ | 0.5 | 90 | 15 | [3] 0.14, [4] 0.14 | Slightly tough, brittle solid; M.P. of 107°–109° C. |
| 46 | $(n\text{-}C_4H_9)_2Zn$ | 0.5 | 90 | 4 | [3] 0.18 | Slightly tough, brittle solid. |
| 47 | $(n\text{-}CH_3)_2Cd$ | 0.5 | 90 | 5 | [3] 0.20, [4] 0.22 | Do. |
| 48 | $(n\text{-}CH_3)_2Cd$ | 0.75 | 90 | 5 | [3] 0.22, [4] 0.22 | Do. |
| 49 | $(n\text{-}CH_3)_2Cd$ | 1.0 | 70 | 10–15 | [3] 0.27 | Tough, fiber-forming solid; fibers could be cold-drawn; M.P. of 106°–107° C. |
| 50 | $(n\text{-}CH_3)_2Cd$ | 1.0 | 70 | 3 | [3] 0.28 | Tough, fiber-forming solid; M.P. of 106°–107° C. |

[1] In Example 50, a 30 weight percent solution of 2-keto-1,4-dioxane in dioxane was employed.
[2] Weight percent catalyst, based on the weight of 2-keto-1,4-dioxane.
[3] Measured at 0.2 gram of polymer in 100 ml. of dioxane at 70° C.
[4] Measured at 0.4 gram of polymer in 100 ml. of chloroform at 30° C.

EXAMPLE 51

A. To a reaction vessel maintained under a nitrogen atmosphere and which contained a mixture of 50 weight percent epsilon-caprolactone and 50 weight percent 2-keto-1,4-dioxane, there was charged di-n-butylzinc in an amount so as to give a final admixture containing 0.5 weight percent di-n-butylzinc, based on the total weight of the monomeric charge. The reaction vessel then was placed in a constant temperature bath maintained at 90° C. Within 7 minutes the mechanical stirrer ceased due to the high viscosity of the contents in the reaction vessel. Thereafter, the polymeric product was recovered. There was obtained a soft, tacky solid copolymer.

B. In an analogous manner as above, when gamma(1-isopropyl - 4 - methylcyclohexyl)-epsilon-caprolactone is substituted for the lactone mixture and contacted with 1.0 weight percent 1-butynylmagnesium chloride, there is obtained a viscous liquid product.

EXAMPLES 52–58

In Examples 52 through 58, various copolymers were prepared by contacting, at 90° C., a mixture of epsilon-caprolactone and delta-valerolactone with 0.5 weight percent of di-n-butylzinc, based on the total weight of the lactone feed. The procedure employed was similar to that set forth immediately preceding the operative examples. The pertinent data and results are recorded in Table VIII below.

Table VIII

| Ex. No. | Ratio of epsilon-caprolactone to delta-valerolactone [1] | Time, min. | Reduced viscosity | Description of copolymer |
|---|---|---|---|---|
| 52 | 20:80 | 4 | [2] 1.22 | White, crystalline solid. |
| 53 | 25:75 | 2 | [3] 1.40 | Tough, crystalline solid. |
| 54 | 40:60 | 3 | [2] 1.21 | Tacky, non-crystalline solid. |
| 55 | 50:50 | 2 | [3] 1.05 | Soft, rubbery solid. |
| 56 | 60:40 | 2 | [3] 0.84 | Soft, tacky, non-crystalline solid. |
| 57 | 70:30 | 2 | [3] 0.69 | Tough, hard solid; crystallized in 4 days. |
| 58 | 80:20 | 2 | [3] 0.74 | Tough solid; crystallized in 1 day. |

[1] Ratio is in parts by weight.
[2] Measured at 0.40 gram of polymer in 100 ml. of chloroform at 30° C.
[3] Measured at 0.2 gram of polymer in 100 ml. of benzene at 30° C.

EXAMPLES 59–67

In Examples 59–67, various copolymers were prepared by contacting, at 90° C., a mixture of epsilon-caprolactone and mixed methyl-epsilon-caprolactone with 0.5 weight percent of di-n-butylzinc, based on the total weight of the lactone feed. The mixed methyl-epsilon-caprolactone employed is the isomeric mixture described in Example 19 supra. The procedure used was similar to that set forth immediately preceding the operative examples. The pertinent data and results are recorded in Table IX.

Table IX

| Ex. No. | Ratio of epsilon-caprolactone to mixed methyl epsilon caprolactone [1] | Time, min. | Reduced viscosity [2] | Description of polyester |
|---|---|---|---|---|
| 59 | 95:5 | 3 | 1.0 | Hard, crystalline solid. |
| 60 | 90:10 | 5 | 0.97 | Do. |
| 61 | 80:20 | 5 | 0.57 | Do. |
| 62 | 70:30 | 2 | 1.27 | Tough, flexible, rubbery solid which slowly crystallized. |
| 63 | 70:30 | 2 | [3][4] 1.11 | Tough, rubber, non-crystalline solid; could be cold-drawn to a tough film. |
| 64 | 60:40 | 3 | [3][4] 0.90 | Non-crystalline, rubbery solid. |
| 65 | 60:40 | 2 | 0.74 | Soft solid. |
| 66 | 40:60 | 4 | 0.46 | Very viscous semi-solid. |
| 67 | 20:80 | 8 | 0.27 | Very viscous liquid. |

[1] Ratio is in parts by weight.
[2] Measured at 0.2 gram of polymer in 100 ml. of benzene.
[3] Milled.
[4] Dissolved in acetone and reprecipitated in water.

EXAMPLE 68

A. To a reaction vessel maintained under a nitrogen atmosphere and which contained a mixture of 80 parts by weight of epsilon-caprolactone and 20 parts by weight of mixed dimethyl-epsilon-caprolactones, there was charged di-n-butylzinc in an amount so as to give an admixture containing 0.5 weight percent di-n-butylzinc, based on the total weight of the lactone feed. The mixed dimethyl-epsilon-caprolactones was an isomeric mixture of beta, gamma-dimethyl- and gamma,delta-dimethyl-epsilon-caprolactones. The reaction vessel then was placed in a constant temperature bath maintained at 90° C. Within 2 minutes the mechanical stirrer ceased due to the high viscosity of the contents in the reaction vessel. Thereafter, the reaction product was dissolved in acetone and reprecipitated in water. There was obtained a tough, crystalline solid copolymer which possessed a reduced viscosity value of 0.84 (measured at 0.2 gram of polymer in 100 ml. of benzene).

B. In an analogous manner as above, when equal parts by weight of 12-oxa-15-hydroxypentadecanoic acid lactone and 7-hydroxyheptanoic acid lactone are employed as the monomeric feed and contacted with 1.0 weight percent phenylmagnesium cyclohexyloxide, there is obtained a soft solid product.

EXAMPLE 69

A. To a reaction vessel maintained under a nitrogen atmosphere and which contained a mixture of 50 parts by weight of epsilon-caprolactone and 50 parts by weight of mixed octyl-epsilon-caprolactones, there was charged di-n-butylzinc in an amount so as to give an admixture containing 0.5 weight percent di-n-butylzinc, based on the total weight of the lactone feed. The mixed octyl-caprolactones comprised a major proportion by weight of gamma-octyl- and a minor proportion by weight of epsilon-octyl-epsilon-caprolactones. The reaction vessel then was placed in a constant temperature bath maintained at 90° C. Within 20 minutes the mechanical stirrer ceased due to the high viscosity of the contents in the reaction vessel. Thereafter, the reaction product was dissolved in acetone and reprecipitated in water. There was obtained a soft, waxy copolymer which possessed a reduced viscosity value of 0.26 (measured at 0.2 gram of polymer in 100 ml. of benzene).

B. In an analogous manner as above, when equal parts by weight of 9-oxabicyclo[5.2.2]undecan-8-one and 1,4-dioxane-2-one are employed as the monomeric feed and contacted with 1.5 weight percent diphenylmagnesium, essentially similar results are obtained.

EXAMPLE 70

To a reaction vessel maintained under a nitrogen atmosphere and which contained equal parts, by weight, of 2,4-dimethyl-4-methoxymethyl-5-hydroxypentanoic acid lactone and epsilon-caprolactone, there was charged di-n-butylzinc in an amount so as to give an admixture containing 0.5 weight percent di-n-butylzinc, based on the total weight of the monomeric charge. The reaction vessel then was placed in a constant temperature bath maintained at 90° C. Within one minute the mechanical stirrer ceased due to the high viscosity of the contents in the reaction vessel. Thereafter, the reaction product was dissolved in acetone and reprecipitated in water. There was obtained a soft, waxy, solid copolymer. The yield was 67 percent.

EXAMPLES 71–92

In Examples 71 through 92 the polymerization reaction was conducted in a manner similar to that set forth immediately preceding the operative examples. The pertinent data and results are recorded in Table X below.

Table X

| Ex. No. | Lactone [1] | Catalyst | Catalyst concentration [2] | Temp. °C. | Time, min. | Reduced viscosity | Remarks |
|---|---|---|---|---|---|---|---|
| 71 | Epsilon-caprolactone | $(CH_3)_2Cd$ | 0.2 | 90 | 5 | [3] 5.25 | Extremely tough, fiber-forming crystalline solid. |
| 72 | ----- do ----- | $(CH_3)_2Cd$ | 0.4 | 90 | 4 | [3] 6.67 | Do. |
| 73 | ----- do ----- | n-Octylmagnesium | 0.33 | 90 | 4 | [3] 1.14 | Tough, white crystalline solid. |
| 74 | ----- do ----- | Phenylmagnesium bromide. | 0.4 | 90 | 5 | [4] 1.03 | Do. |
| 75 | Epsilon-methyl-epsilon-caprolactone | $(CH_3)_2Cd$ | 0.33 | 90 | 16 | [3] 1.20 | Non-crystalline tacky solid. |
| 76 | Gamma-methyl-epsilon-lactone | $(CH_3)_2Cd$ | 0.33 | 90 | 4 | [3] 1.65 | Tough, non-crystalline solid. |
| 77 | Mixed dimethyl-epsilon-caprolactones [5] | $(CH_3)_2Cd$ | 0.5 | 90 | 10 | | Non-crystalline solid. |
| 78 | Beta-methyl-epsilon-isopropyl-epsilon-lactone. | $(CH_3)_2Cd$ | 1.0 | 90 | 35 | [4] 0.22 | Very viscous liquid. |
| 79 | Beta-isopropyl-epsilon-methyl-epsilon-caprolactone. | $(n\text{-}C_4H_9)_2Zn$ | 1.5 | 90 | 35 | [4] 0.12 | Do. |
| 80 | Gamma-octyl-epsilon-caprolactone | $(CH_3)_2Cd$ | 0.3 | 90 | 5 | [4] 0.50 | Soft, non-crystalline solid. |
| 81 | Alpha,delta-endomethylene-epsilon-caprolactone. | $(CH_3)_2Cd$ | 1.2 | 90 | 15 | | Viscous liquid. |
| 82 | Ortho - (2 - hydroxyethyl) - phenylacetic acid lactone. | $(CH_3)_2Cd$ | 0.3 | 90 | 12 | [4] 0.72 | Fiber-forming solid; M.P. of 122°–126° C. |
| 83 | ----- do ----- | $(n\text{-}C_4H_9)_2Zn$ | 0.4 | 90 | 40 | [4] 0.27 | Hard solid. |
| 84 | Cis-3-oxabicyclo[5.4.0]-undecan-4-one | $(CH_3)_2Cd$ | 0.5 | 110 | 3 | [4] 0.79 | Non-crystalline, rubbery solid. |
| 85 | 80 epsilon-caprolactone/20 delta-valerolactone. | $(n\text{-}C_4H_9)_2Zn$ | 0.3 | 90 | 1.5 | [4] 1.32 | Rough, semi-crystalline solid. |
| 86 | 20 epsilon-caprolactone/80 delta-valerolactone. | $(n\text{-}C_4H_9)_2Zn$ | 0.3 | 90 | 1 | [4] 1.44 | Do. |
| 87 | 70 Epsilon-caprolactone/30 mixed methyl-epsilon-caprolactones.[6] | $(n\text{-}C_4H_9)_2Zn$ | 0.2 | 50 | 52 | [3] 3.84 | Extremely tough, non-crystalline solid. |
| 88 | 75 Epsilon-caprolactone/25 mixed methyl-epsilon-caprolactones.[6] | $(CH_3)_2Cd$ | 0.2 | 90 | 4 | [4] 2.40 | Tough, semi-crystalline solid. |
| 89 | ----- do.[6] ----- | $(CH_3)_2Cd$ | 0.75 | 90 | 1 | [4] 1.25 | Non-crystalline solid. |
| 90 | 80 Epsilon-caprolactone/20 mixed dimethyl-epsilon-caprolactones.[5] | $(CH_3)_2Cd$ | 0.3 | 90 | 6.5 | [3] 3.98 | Very tough, semi-crystalline solid. |
| 91 | 70 Delta-valerolactone/30 beta-methyl-delta-valerolactone. | $(CH_3)_2Cd$ | 0.3 | 90 | 2 | [3] 1.43 | Semi-crystalline solid. |
| 92 | 70 Delta-valerolactone/30 mixed methyl-epsilon-caprolactones.[6] | $(CH_3)_2Cd$ | 0.3 | 90 | 6 | [3] 1.57 | Tough, semi-crystalline solid. |

[1] Copolymer is expressed in parts by weight.
[2] Weight percent catalyst, based on the total weight of monomeric feed.
[3] Measured at 0.4 gram of polymer in 100 ml. of chloroform.
[4] Measured at 0.2 gram of polymer in 100 ml. of chloroform.
[5] Isomeric mixture of dimethyl-epsilon-caprolactones.
[6] Mixed methyl-epsilon-caprolactones represent an isomeric mixture which contain, by weight, about 30 percent gamma-methyl-, about 30 percent epsilon-methyl-, and about 40 percent beta-methyl- and delta-methyl-epsilon-caprolactones.

EXAMPLE 93

To a reaction vessel maintained under a nitrogen atmosphere and which contained epsilon-caprolactone, there was charged vinylmagnesium chloride in an amount so as to give an admixture containing 0.2 weight percent vinylmagnesium chloride, based on the weight of said epsilon-caprolactone. The reaction vessel then was placed in a constant temperature bath maintained at 90° C. Within seconds the mechanical stirrer ceased due to the high viscosity of the contents in the reaction vessel. Thereafter, the polymer was recovered. There was obtained a tough, solid homopolymer which possessed a reduced viscosity value of 0.75 (measured at 0.2 gram of polymer in 100 ml. of chloroform).

EXAMPLES 94–116

In Examples 94 through 116, several different cyclic esters were contacted with various compounds with the exceptions noted in Examples 94, 102, 103, 104 and 114. The procedure employed was similar to that set forth immediately preceding the operative examples. The pertinent data and results are recorded in Table XI below.

Table XI

| Ex. No. | Lactone | Catalyst | Catalyst concentration [1] | Temp. °C. | Time | Viscosity | Remarks |
|---|---|---|---|---|---|---|---|
| 94 | Epsilon-caprolactone | None | | 150 | 230 hrs | | Waxy, brittle, white solid. |
| 95 | ----- do ----- | Lead diacetate | 0.5 | 150 | 300 min | [2] 0.2 | Soft, tan solid. |
| 96 | ----- do ----- | $H_2SO_4$ | 0.3 | 90 | 30 min | [3] 0.15 | Hard, crumbly tan solid. |
| 97 | ----- do ----- | p-Toluenesulfonic | 0.05 | 90 | 2 hrs [4] | [3] [5] 0.20 | Waxy, solid. |
| 98 | ----- do ----- | $AlCl_3$ | 0.5 | 22–24 | Several weeks. | | White brittle solid. |
| 99 | ----- do ----- | Stannic chloride | 0.3 | 90 | 120 min | [3] 0.16 | Waxy, brittle, tan solid. |
| 100 | ----- do ----- | $FeCl_3$ | 0.6 | 90 | 300 min | [2] 0.2 | Soft, brittle, tan solid. |
| 101 | Mixed methyl-epsilon-caprolactone [6] | $K_2CO_3$ | 0.5 | 150 | 28 hrs | | Very slightly viscous. |
| 102 | ----- do.[6] ----- | None | | 150 | 6 wks | | No reaction. |
| 103 | Delta-valerolactone | ----- do ----- | | 25 | 10 days | | Do. |
| 104 | ----- do ----- | ----- do ----- | | 90 | ----- do ----- | | Brittle solid; M.P. of 56° C. |
| 105 | ----- do ----- | $K_2CO_3$ | 0.4 | 90 | 22 hrs | | No reaction. |
| 106 | ----- do ----- | $K_2CO_3$ | 0.2 | 150 | 19 hrs | [2] 0.05 | Waxy, tan solid; M.P. of 54° C. |
| 107 | ----- do ----- | Zn dust | 0.1 | 150 | 22 hrs | [2] 0.11 | Waxy, tan solid; M.P. of 57° C. |
| 108 | ----- do ----- | Red $Pb_3O_4$ | 0.1 | [7] 150 | ----- do ----- | [2] 0.28 | Waxy, tan solid; M.P. of 55° C. |
| 109 | Beta-methyl-delta-valerolactone | $K_2CO_3$ | 0.5 | 90 | 2 days | | No reaction. |
| 110 | ----- do ----- | p-Toluenesulfonic acid | 0.5 | 90 | 60 hrs | [2] 0.19 | Dark brown, viscous liquid. |
| 111 | ----- do ----- | Stannic chloride | 0.5 | 90 | ----- do ----- | [2] 0.16 | Do. |
| 112 | Zeta-enantholactone | $K_2CO_3$ | 0.5 | 25 | 3 days | | No reaction. |
| 113 | ----- do ----- | p-Toluenesulfonic acid | 0.67 | 25 | 1,400 min | [2] 0.27 | Crumbly, white solid; M.P. of 67°–68° C. |
| 114 | 1,4-dioxane-2-one | None | | 90 | 20 hrs | | No reaction. |
| 115 | ----- do ----- | Aniline | 1.0 | 90 | 18 hrs | | Do. |
| 116 | ----- do ----- | p-Toluenesulfonic acid | 1.0 | 90 | 8 min | [3] 0.05 | Brittle solid. |

[1] Weight percent catalyst, based on weight of lactone.
[2] Measured at 0.2 gram of polymer in 100 ml. of benzene at 30° C.
[3] Measured at 0.4 gram of polymer in 100 ml. of chloroform at 30° C.
[4] Viscous, but stirring did not stop in 2 hours.
[5] Reaction product was dissolved in acetone and reprecipitated in water.
[6] Isomeric mixture containing, by weight, 30 percent gamma-methyl-, about 30 percent epsilon-methyl-, and about 40 percent beta-methyl- plus delta-methyl-epsilon-caprolactones.
[7] No reaction at 90° C.

In Examples 117 through 122, various novel relatively high molecular weight polyesters were tested as plasticizers for poly(vinyl chloride) which had a reduced viscosity value of 0.9 as measured at a concentration of 0.2 gram of said poly(vinyl chloride) per 100 milliliters of nitrobenzene at 20° C. In reporting the physical properties of the plasticized poly(vinyl chloride) compositions certain symbols and abbreviations are employed. These symbols and abbreviations (and various tests) are defined as follows:

(1) A.S.T.M.=American Society of Testing Materials.

(2) $T_f$ and $T_4$=temperatures at which torsional stiffness moduli are 135,000 and 10,000 p.s.i., respectively, as determined in accordance with A.S.T.M. Method D1043–51.

(3) $T_b$ (brittle temperature)=low temperature impact measurement as determined in accordance with A.S.T.M. Method D746–55T.

(4) Volatility determined in accordance with A.S.T.M. Method D1203–55 (test temperature of 70° C.).

(5) Oil extraction (test temperature of 50° C.) determined in accordance with the formula:

$$E_0 = \frac{100(W_1 - W_2)}{W_2}$$

wherein $E_0$ is the weight percent extraction of plasticizer, wherein $W_1$ is the original weight of the plasticized sample, and wherein $W_2$ is the final weight of the plasticized sample after subjecting sample to mineral oil extraction test for a period of time, followed by drying in a circulating air oven at 70° C. for 30 minutes.

(6) Water extraction (test temperature of 70° C.) determined in accordance with the formula:

$$E_W = \left(\frac{100(W_1 - W_2)}{W_1}\right)\left(\frac{t(\text{actual})}{0.004}\right)$$

wherein $E_W$ is the weight percent extraction of plasticizer, wherein $W_1$ is the original weight of the plasticized sample, wherein $W_2$ is the final weight of the plasticized sample after subjecting sample to water extraction test for a period of time, followed by drying in a circulating air oven at 70° C. for 30 minutes, and wherein $t$(actual) is the actual thickness of the sample.

(7) $I_R$=reduced viscosity value of polyester determined at a concentration of 0.2 gram of said polyester per 100 milliliters of chloroform at 30° C. (or with indicated solvent, e.g., benzene).

(8) Stiffness modulus=the secant tensile modulus at one percent elongation as determined on an Instron tensile tester at 25° C.

(9) Tensile, elongation, and elongation modulus were determined on a Scott L–6 tensile tester operating at a constant rate of elongation of 4 feet per minute. These tests were performed at 23° C.

(10) Durometer A hardness determined in accordance with A.S.T.M. Method D676–49T.

EXAMPLE 117

Poly(vinyl chloride) was mechanically mixed with 0.5 weight percent dibutyltin maleate and 45 weight percent poly-epsilon-caprolactone, both based on the weight of poly(vinyl chloride). The resulting mixture then was fluxed on a steam-heated, two-roll mill maintained at 158° C. The dibutyltin maleate served as a heat and light stabilizer. The poly-epsilon-caprolactone possessed an $I_R$ value of 1.1 and was prepared by polymerizing epsilon-caprolactone in the presence of dibutylzinc catalyst. The plasticized composition had the properties set out in Table XII below.

*Table XII*

| | |
|---|---|
| Milled, minutes/° C. | 5 min./158°–120° C. |
| Tensile strength, p.s.i. | 2100. |
| Elongation, percent | 350. |
| Load at 100% elongation, p.s.i. | 1475. |
| Instron stiffness modulus, at 25° C., p.s.i. | 1238. |
| $T_f$, ° C. | −20°. |
| $T_4$, ° C. | 7°. |
| $T_b$, ° C. | −46°. |
| Extraction: | |
|   Water, 24 hrs., at 70° C., percent | 0.3. |
|   Oil, 50° C. | Slight. |
| Volatile loss, percent in 24 hrs. at 70° C. | Nil. |

EXAMPLE 118

Poly(vinyl chloride) was mechanically mixed with 0.5 weight percent dibutyltin maleate stabilizer and 45 weight percent 60 epsilon-caprolactone/40 isomeric mixture of methyl-epsilon-caprolactone copolymer, both based on the weight of said poly(vinyl chloride). The isomeric mixture of methyl-epsilon-caprolactone contained about 30 weight percent epsilon-methyl-, about 30 weight percent gamma-methyl-, and about 40 weight percent beta-methyl- and delta-methyl-epsilon-caprolactones. The copolymer possessed a reduced viscosity value of 0.9 (in benzene). The copolymer was prepared by conducting the polymerization reaction in the presence of dibutylzinc. The resulting mixture then was fluxed on a steam-heated, two-roll mill maintained at 158° C. The plasticized composition had the properties set forth in Table XIII below.

*Table XIII*

| | |
|---|---|
| Milled, minutes/° C. | 5 min./158°–120° C. |
| Tensile strength, p.s.i. | 1925. |
| Elongation, percent | 390. |
| Load at 100% elongation, p.s.i. | 975. |
| Instron stiffness modulus, at 25° C., p.s.i. | 772. |
| $T_f$, ° C. | −19°. |
| $T_4$, ° C. | 0°. |
| $T_b$, ° C. | −52°. |
| Extraction: | |
|   Water, 24 hrs., at 70° C., percent | |
|   Oil, 50° C. | Nil. |
| Volatile loss, percent in 24 hrs. at 70° C. | |

EXAMPLE 119

Poly(vinyl chloride) was mechanically mixed with 0.5 weight percent dibutyltin maleate stabilizer and 45 weight percent 80 epsilon-caprolactone/20 isomeric mixture of methyl-epsilon-caprolactone copolymer, both based on the weight of said poly(vinyl chloride). The isomeric mixture of methyl-epsilon-caprolactone contained about 30 weight percent epsilon-methyl-, about 30 weight percent gamma-methyl-, and about 40 weight percent beta-methyl- and delta-methyl-epsilon-caprolactones. The copolymer possessed a reduced viscosity value of 1.1 (in benzene). The copolymer was prepared by conducting the polymerization reaction in the presence of dibutylzinc. The resulting mixture then was fluxed on a steam-heated, two-roll mill maintained at 158° C. The plasticized composition had the properties set forth in Table XIV.

*Table XIV*

| | |
|---|---|
| Milled, minutes/° C. | 5 min./158°–120° C. |
| Tensile strength, p.s.i. | 2100. |
| Elongation, percent | 500. |
| Load at 100% elongation, p.s.i. | 1140. |
| Instron stiffness modulus, at 25° C., p.s.i. | 810. |
| $T_f$, ° C. | −20°. |
| $T_4$, ° C. | −3°. |
| $T_b$, ° C. | −64°. |

EXAMPLE 120

Poly(vinyl chloride) was mechanically mixed with 1.5 weight percent stabilizer and 45 weight % epsilon-caprolactone/30 isomeric mixture of methyl-epsilon-caprolactone copylymer, both based on the weight of said poly(vinly chloride). The isomeric mixture of methyl-epsilon-caprolactone is described in Example 119. The copolymer possessed a reduced viscosity value of 4.8 and was prepared by conducting the polymerization reaction in the presence of dibutylzinc. The resulting mixture then was fluxed on a steam-heated, two-roll mill maintained at 158° C. for a period of 5 minutes. The plasticized composition had the properties set forth in Table XV below.

*Table XV*

| | |
|---|---|
| Tensile strength, p.s.i. | 1950 |
| Elongation, percent | 575 |
| Load at 100% elongation, p.s.i. | 820 |
| Instron stiffness modulus, at 25° C., p.s.i. | 1021 |
| $T_f$, ° C. | −21.5° |
| $T_4$, ° C. | −4° |
| $T_b$, ° C. | −64° |

EXAMPLE 121

Poly(vinyl chloride) was mechanically mixed with 0.5 weight percent dibutyltin maleate and 34 weight percent 80 epsilon-caprolactone/20 zeta-enantholactone copolymer which had a reduced viscosity value of 0.96. The resulting mixture was then fluxed on a steam-heated, two-roll mill maintained at 158° C. for a period of 5 minutes. The plasticized composition had the properties set forth in Table XVI below.

*Table XVI*

| | |
|---|---|
| Tensile strength, p.s.i. | 2475 |
| Elongation, percent | 260 |
| Load at 100% elongation, p.s.i. | 1850 |
| Instron stiffness modulus, at 25° C., p.s.i. | |
| $T_f$, ° C. | −6° |
| $T_4$, ° C. | 14° |
| $T_b$, ° C. | −8° |
| Extraction: | |
| Water, 24 hrs., at 70° C., percent | 0.7 |
| Oil, 50° C. | |
| Volatile loss, percent in 2 hrs. at 70° C. | 0.3 |

EXAMPLE 122

Poly-epsilon-caprolactone ($I_R$ of 2.63) and poly-delta-valerolactone ($I_R$ of 2.29) were evaluated for physical characteristics and are set forth in Table XVII below. Attempts to evaluate a poly-epsilon-caprolactone sample ($I_R$ of 0.12) and a poly-delta-valerolactone sample ($I_R$ of 0.13) were unsuccessful due to the waxy and brittle nature of these relatively low molecular weight polyesters. The data and results of the relatively high molecular weight polyesters are recorded in Table XVII below.

*Table XVII*

| | Poly-epsilon-caprolactone | Poly-delta-valerolactone |
|---|---|---|
| $I_R$ | 2.63 | 2.29 |
| Tensile strength, p.s.i. | 4,629 | 6,167 |
| Elongation, percent | 1,274 | 1,450 |
| Stiffness modulus, p.s.i. | 47,264 | 46,082 |
| $T_b$, °C. | −66 | −60 |

The data revealed in Table XVII supra indicated that tougher and more extensible films, i.e., less prone to tearing on stretching, can be prepared or manufactured from vinyl resins plasticized with the novel relatively high molecular weight polyesters of the invention than is the case with said vinyl resins (of the same order of flexibility) which are plasticized with conventional plasticizers, e.g., dioctyl phthalate.

Moreover, the data revealed in Examples 117-121 also emphatically teach the highly unexpected and obvious results which are obtained by plasticizing poly(vinyl chloride) with the novel polyesters of the invention. In particular, the astounding brittle temperatures ($T_b$) and the excellent oil and water extractions should be noted. The brittle temperatures achieved represent a vast improvement in the plasticizer field.

EXAMPLE 123

In this example, four strips of poly(vinyl chloride) having an $I_R$ of 0.9 were bonded together with three films of 70 epsilon-caprolactone/30 isomeric mixture of methyl-epsilon-caprolactone copolymer described previously. The $I_R$ of the copolymer was 1.89. The strips of poly(vinyl chloride) were approximately 100 mils in thickness whereas the films of copolymer were approximately 15–20 mils in thickness. The "sandwich" strips then were placed in a mold and the temperature was maintained at 175° C. for 5 minutes plus an additional 5 minutes while applying a pressure of about 300 p.s.i.g. The molded or bonded poly(vinyl chloride) was recovered from the mold at room temperature, i.e., about 23° C.

The above procedure was repeated except a liquid 70 epsilon-caprolactone/30 isomeric mixture of methyl-epsilon-caprolactone copolymer having an $I_R$ of 0.42 was applied to the surfaces of the poly(vinyl chloride) strips.

The above procedure again was repeated except no bonding agent was employed (control).

The results are set forth in Table XVIII below.

*Table XVIII*

| | Control | Copolymer | |
|---|---|---|---|
| | | $I_R$=1.89 | $I_R$=0.42 |
| Izod impact A.S.T.M. D256-54 | 0.5 | 1.1 | 0.4 |

The above data reveals the vast improvement in the Izod impact value when employing the relative high molecular weight copolymer ($I_R$ of 1.89) as compared with the relatively low molecular weight liquid copolymer ($I_R$ of 0.42) or the control. These results are highly significant and quite unexpected, indeed.

EXAMPLE 124

Twenty parts by weight of 80 epsilon-caprolactone/20 delta-valerolactone copolymer having an $I_R$ of 2.2 was added to 100 parts by weight of "green" linoleum. The "green" linoleum contained 35 weight percent gelled oleoresinous binder (3 weight percent PbO drier) and 65 weight percent filler (wood flour, ground limestone, and titanium dioxide). The resulting mixture was compounded on a two-roll mill maintained at 70° C. for about 5 minutes. The milling operation was conducted smoothly; the mixture became homogeneous in a short period of time with no stickiness or tackiness being observed. A sheet of approximately 60 mils in thickness was readily removed by hand from the rolls at 70° C. The milled sheet was tough and could be hand bent double without cracking. Samples of this sheet subsequently were cured at 85° C. for varying periods of time.

The above procedure was repeated with 20 parts by weight of 80 epsilon-caprolactone/20 delta-valerolactone copolymer having an $I_R$ of 0.68. This mixture was slow to disperse on the two-roll mill, and the resulting band on the mill was sticky and tacky at 70° C. The mill was cooled to 40° C., however, the band was still tacky and sticky. The resulting compounded sheet was too weak to be removed by hand and thus, it had to be scraped off.

The above procedure was repeated except no copolymer was incorporated into the green linoleum (control). With the mill maintained at 70° C. The compounding of the unmodified "green" linoleum on the two-roll mill resulted in a cheesy, crumbly, readily prone-to-cracking sheets or bands. The resulting compounded sheet was weak and contained cracks. The sheet was too weak to be removed by hand at 70° C.; at 40° C. the sheet was hand peeled. The results and pertinent data are set forth in Table XIX below.

Table XIX

| | Control | Copolymer | |
|---|---|---|---|
| | | $I_R=2.2$ | $I_R=0.68$ |
| Durometer A, initial | 58 | 77 | 9 |
| Durometer A, 2 days at 85° C | 86 | 87 | 65 |
| Durometer A, 3 days at 85° C | 86 | 90 | 73 |
| Durometer A, 5 days at 85° C | 88 | 91 | 79 |
| Durometer A, 8 days at 85° C | 89 | 91 | 79 |
| Durometer A, 10 days at 85° C | 90 | 92 | 79 |

Although the invention has been illustrated by the preceding examples, the invention is not to be construed as limited to the materials employed in the above exemplary examples, but rather, the invention encompasses the generic area as hereinbefore disclosed. Various modifications and embodiments of this invention can be made without departing from the spirit and scope thereof.

What is claimed is:

1. A process which comprises contacting a cyclic ester characterized by the following formula:

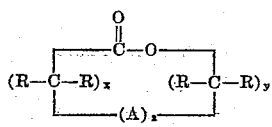

wherein each R, individually, is selected from the group consisting of hydrogen, alkyl, aryl, alkaryl, aralkyl, cycloalkyl, halo, haloalkyl, alkoxyalkyl, alkoxy, aryloxy, a portion of an aromatic hydrocarbon nucleus which nucleus is fused to the cyclic ester ring, and a portion of a saturated cycloaliphatic hydrocarbon nucleus which nucleus contains from 4 to 10 carbon atoms and which is fused to the cyclic ester ring; wherein A is selected from the group consisting of an oxy group, a thio group, and a divalent saturated aliphatic hydrocarbon group; wherein $x$ is an integer in the range of from 1 to 15 inclusive; wherein $y$ is an integer in the range of from 1 to 15 inclusive; and wherein $z$ is an integer selected from the group consisting of zero and one; with the provisos that (a) the sum of $x+y+z$ cannot equal three, (b) the total number of atoms forming the cyclic ester ring does not exceed 18, and (c) the total number of organic substituents attached to the carbon atoms contained in the cyclic ester ring does not exceed four; with from about 0.001 to about 10 weight percent, based on the weight of said cyclic ester, of an organometallic compound characterized by the following formula:

wherein M represents a group II metal in the periodic table; wherein $R_a$ is selected from the group consisting of a monovalent hydrocarbon radical, a pyridyl radical, and a furyl radical; and wherein $R_b$ is selected from the group consisting of hydrogen, halo, a monovalent hydrocarbon radical, a secondary amino radical a hydrocarbyloxy radical, a pyridyl radical, and a furyl radical; for a period of time sufficient to produce a polymer.

2. A process which comprises contacting an admixture comprising at least two cyclic esters which are characterized by the following formula:

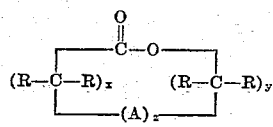

wherein each R, individually, is selected from the group consisting of hydrogen, alkyl, aryl, alkaryl, aralkyl, cycloalkyl, halo, haloalkyl, alkoxyalkyl, alkoxy, aryloxy, a portion of an aromatic hydrocarbon nucleus which nucleus is fused to the cyclic ester ring, and a portion of a saturated cycloaliphatic hydrocarbon nucleus which nucleus contains from 4 to 10 carbon atoms and which is fused to the cyclic ester ring; wherein A is selected from the group consisting of an oxy group, a thio group, and a divalent saturated aliphatic hydrocarbon group; wherein $x$ is an integer in the range of from 1 to 15 inclusive; wherein $y$ is an integer in the range of from 1 to 15 inclusive; and wherein $z$ is an integer selected from the group consisting of zero and one; with the provisos that (a) the sum of $x+y+z$ cannot equal three, (b) the total number of atoms forming the cyclic ester ring does not exceed 18, and (c) the total number of organic substituents attached to the carbon atoms contained in the cyclic ester ring does not exceed four; with from about 0.001 to about 10 weight percent, based on the weight of said cyclic esters, of an organometallic compound characterized by the following formula:

wherein M represents a group II metal in the periodic table; wherein $R_a$ is selected from the group consisting of a monovalent hydrocarbon radical, a pyridyl radical, and a furyl radical; and wherein $R_b$ is selected from the group consisting of hydrogen, halo, a monovalent hydrocarbon radical, a secondary amino radical a hydrocarbyloxy radical, a pyridyl radical, and a furyl radical; for a period of time sufficient to produce a polymer.

3. A process which comprises contacting delta-valerolactone with from about 0.01 to about 3.0 weight percent, based on the weight of said delta-valerolactone, of a dialkyl of a group II metal of the periodic table; at a temperature in the range of from about 0° C. to about 225° C.; and for a period of time sufficient to produce a polymer.

4. A process which comprises contacting an alkyl-substituted delta-valeralactone with from about 0.01 to about 3.0 weight percent, based on the weight of said alkyl-substituted delta-valerolactone, of a dialkyl of a group II metal of the periodic table; at a temperature in the range of from about 0° C. to about 225° C.; and for a period of time sufficient to produce a polymer.

5. A process which comprises contacting epsilon-caprolactone with from about 0.01 to about 3.0 weight percent, based on the weight of said epsilon-caprolactone, of a dialkyl of a group II metal of the periodic table; at a temperature in the range of from about 0° C. to about 225° C.; and for a period of time sufficient to produce a polymer.

6. The process of claim 5 wherein said dialkylmetal is dialkylcadmium.

7. The process of claim 5 wherein said dialkylmetal is dialkylzinc.

8. A process which comprises contacting an alkyl-substituted epsilon-caprolactone with from about 0.01 to about 3.0 weight percent, based on the weight of said alkyl-substituted epsilon-caprolactone, of a dialkyl of a group II metal of the periodic table; at a temperature in the range of from about 0° C. to about 225° C.; and for a period of time sufficient to produce a polymer.

9. A process which comprises contacting a monomeric lactone admixture comprising delta-valerolactone and an alkyl-substituted delta-valerolactone with from about 0.01 to about 3.0 weight percent, based on the total weight of the monomeric lactone feed, of a dialkyl of a group II metal of the periodic table; at a temperature in the range of from about 0° C. to about 225° C.; and for a period of time sufficient to produce a polymer.

10. A process which comprises contacting a monomeric lactone admixture comprising delta-valerolactone and epsilon-caprolactone with from about 0.01 to about 3.0 weight percent, based on the total weight of the monomeric lactone feed, of a dialkyl of a group II metal of the periodic table; at a temperature in the range of from about 0° C. to about 225° C.; and for a period of time sufficient to produce a polymer.

11. A process which comprises contacting a monomeric lactone admixture comprising delta-valerolactone and an alkyl-substituted epsilon-caprolactone with from about 0.01 to about 3.0 weight percent, based on the total weight of the monomeric lactone feed, of a dialkyl of a group II metal of the periodic table; at a temperature in the range of from about 0° C. to about 225° C.; and for a period of time sufficient to produce a polymer.

12. A process which comprises contacting a monomeric lactone admixture comprising epsilon-caprolactone and an alkyl-substituted delta-valerolactone with from about 0.01 to about 3.0 weight percent, based on the total weight of the monomeric lactone feed, of a dialkyl of a group II metal of the periodic table; at a temperature in the range of from about 0° C. to about 225° C.; and for a period of time sufficient to produce a polymer.

13. A process which comprises contacting a monomeric lactone admixture comprising epsilon-caprolactone and an alkyl-substituted epsilon-caprolactone with from about 0.01 to about 3.0 weight percent, based on the total weight of the monomeric lactone feed, of a dialkyl of a group II metal of the periodic table; at a temperature in the range of from about 0° C. to about 225° C.; and for a period of time sufficient to produce a polymer.

14. A process which comprises contacting a monomeric lactone admixture comprising an alkyl-substituted epsilon-caprolactone and an alkyl-substituted delta-valerolactone with from about 0.01 to about 3.0 weight percent, based on the total weight of the monomeric lactone feed, of a dialkyl of a group II metal of the periodic table; at a temperature in the range of from about 0° C. to about 225° C.; and for a period of time sufficient to produce a polymer.

15. A process which comprises contacting a monomeric lactone admixture comprising two alkyl-substituted epsilon-caprolactones with from about 0.01 to about 3.0 weight percent, based on the total weight of the monomeric lactone feed, of a dialkyl of a group II metal of the periodic table; at a temperature in the range of from about 0° C. to about 225° C.; and for a period of time sufficient to produce a polymer.

16. A solid linear homopolymer characterized by the recurring unit

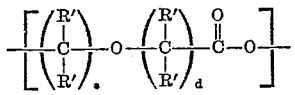

wherein each R' individually, is selected from the group consisting of hydrogen, alkyl, alkoxy, alkoxyalkyl, a portion of an aromatic hydrocarbon nucleus which nucleus is fused to any two adjacent carbon atoms contained in the linear chain of the recurring unit shown above, and a portion of a saturated cycloaliphatic hydrocarbon nucleus which nucleus contains from 4 to 10 carbon atoms and which is fused to 2 to 4 continuously linked carbon atoms contained in the linear chain of the recurring unit shown above; wherein $c$ and $d$, individually, are integers having a value greater than zero and less than 4; and wherein the sum of $c$ plus $d$ is an integer greater than 2 and less than 6; with the proviso that no more than three R' variables attached to the carbon atoms contained in the linear chain of the recurring unit are groups other than hydrogen; said linear homopolymer having a reduced viscosity value of from about 0.25 to about 3.0 as determined at a concentration of 0.4 gram of said homopolymer per 100 milliliters of chloroform at 30° C.

17. Solid poly-2-keto-1,4-dioxane which has a reduced viscosity value in the range of from about 0.25 to about 3.0 as determined at a concentration of 0.4 gram of said homopolymer per 100 milliliters of chloroform at 30° C.

18. A solid linear polymer comprising, in polymerized form, at least two cyclic esters having the formula

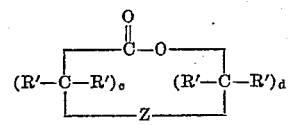

wherein each R', individually, is selected from the group consisting of hydrogen, alkyl, alkoxy, alkoxyalkyl, a portion or an aromatic hydrocarbon nucleus which nucleus is fused to any two adjacent carbon atoms contained in the cyclic ester ring shown above, and a portion of a saturated cycloaliphatic hydrocarbon nucleus which nucleus contains from 4 to 10 carbon atoms and which is fused to 2 to 4 continuously linked carbon atoms contained in the cyclic ester ring shown above; wherein $c$ and $d$, individually, are integers having a value greater than zero and less than 4; wherein the sum of $c$ plus $d$ is an integer greater than 2 and less than 6; and wherein Z is selected from the group consisting of an oxy group and the unit

the values of the R' variables of said unit having the values assigned above; with the proviso that no more than three R' variables attached to the carbon atoms contained in the cyclic ester ring are groups other than hydrogen; and said polymer having a reduced viscosity value in the range of from about 0.8 to about 5.0 as determined at a concentration of 0.4 gram of said polymer per 100 milliliters of chloroform at 30° C.

19. A solid linear polymer comprising at least 15 weight percent of delta-valerolactone in polymerized form with up to 85 weight percent of epsilon-caprolactone, said polymer having a reduced viscosity value in the range of from about 1.0 to about 4.0 as determined at a concentration of 0.4 gram of said polymer per 100 milliliters of chloroform at 30° C.

20. A solid linear polymer comprising at least 15 weight percent of delta-valerolactone in polymerized form with up to 85 weight percent of an alkyl-substituted-epsilon-caprolactone, said polymer having a reduced viscosity value in the range of from about 1.0 to about 4.0 as determined at a concentration of 0.4 gram of said polymer per 100 milliliters of chloroform at 30° C.

21. A solid linear polymer comprising at least 15 weight percent of delta-valerolactone in polymerized form with up to 85 weight percent of an alkyl-substituted-delta-valerolactone, said polymer having a reduced viscosity value in the range of from about 1.0 to about 4.0 as determined at a concentration of 0.4 gram of said polymer per 100 milliliters of chloroform at 30° C.

22. A solid linear polymer comprising at least 15 weight percent of an alkyl-substituted-delta-valerolactone in polymerized form with up to 85 weight percent of a different alkyl-substituted-delta-valerolactone, said polymer having a reduced viscosity value in the range of from about 1.0 to about 4.0 as determined at a concentration of 0.4 gram of said polymer per 100 milliliters of chloroform at 30° C.

23. A solid linear polymer comprising at least 15 weight percent of epsilon-caprolactone in polymerized form with up to 85 weight percent of an alkyl-substituted-epsilon-caprolactone, said polymer having a reduced viscosity value in the range of from about 1.0 to about 4.0 as determined at a concentration of 0.4 gram of said polymer per 100 milliliters of chloroform at 30° C.

24. A solid linear polymer comprising at least 15 weight percent of an alkyl-substituted-epsilon-caprolactone in polymerized form with up to 85 weight percent of a different alkyl-substituted-epsilon-caprolactone, said polymer having a reduced viscosity value in the range of from about 1.0 to about 4.0 as determined at a concentration of 0.4 gram of said polymer per 100 milliliters of chloroform at 30° C.

25. A solid linear polymer comprising at least 15 weight percent of epsilon-caprolactone in polymerized form with up to 85 weight percent methyl-epsilon-caprolactone, said polymer having a reduced viscosity value in the range of from about 1.0 to about 4.0 as determined at a concentration of 0.4 gram of said polymer per 100 milliliters of chloroform at 30° C.

26. A solid linear polymer comprising at least 15 weight percent of epsilon-caprolactone in polymerized form with up to 85 weight percent dimethyl-epsilon-caprolactone, said polymer having a reduced viscosity value in the range of from about 1.0 to about 4.0 as determined at a concentration of 0.4 gram of said polymer per 100 milliliters of chloroform at 30° C.

References Cited in the file of this patent

UNITED STATES PATENTS

| | | |
|---|---|---|
| 2,808,390 | Caldwell | Oct. 1, 1957 |
| 2,809,958 | Barnes | Oct. 15, 1957 |
| 2,822,348 | Haslam | Feb. 4, 1958 |
| 2,848,441 | Reynolds et al. | Aug. 19, 1958 |
| 2,878,236 | Young et al. | Mar. 17, 1958 |
| 2,890,208 | Young et al. | June 9, 1959 |

FOREIGN PATENTS

| | | |
|---|---|---|
| 766,347 | Great Britain | Jan. 23, 1957 |